(12) United States Patent
Beall et al.

(10) Patent No.: US 11,518,707 B2
(45) Date of Patent: Dec. 6, 2022

(54) CHEMICALLY STRENGTHENABLE MACHINABLE GLASS-CERAMICS

(71) Applicant: CORNING INCORPORATED, Corning, NY (US)

(72) Inventors: George Halsey Beall, Big Flats, NY (US); John Philip Finkeldey, Elkland, PA (US); Charlene Marie Smith, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/980,572

(22) PCT Filed: Mar. 18, 2020

(86) PCT No.: PCT/US2020/023238
§ 371 (c)(1),
(2) Date: Sep. 14, 2020

(87) PCT Pub. No.: WO2020/205237
PCT Pub. Date: Oct. 8, 2020

(65) Prior Publication Data
US 2022/0017407 A1  Jan. 20, 2022

Related U.S. Application Data

(60) Provisional application No. 62/828,460, filed on Apr. 2, 2019.

(51) Int. Cl.
*C03C 10/10* (2006.01)
*C03C 10/16* (2006.01)
(Continued)

(52) U.S. Cl.
CPC .......... *C03C 10/0045* (2013.01); *C03B 25/02* (2013.01); *C03B 32/02* (2013.01);
(Continued)

(58) Field of Classification Search
CPC .. C03C 10/0009; C03C 10/0045; C03C 10/16
See application file for complete search history.

(56) References Cited

U.S. PATENT DOCUMENTS

| | | | |
|---|---|---|---|
| 2,920,971 A | 1/1960 | Stookey | |
| 3,689,293 A | 9/1972 | Beall | |

(Continued)

FOREIGN PATENT DOCUMENTS

| | | |
|---|---|---|
| DE | 2432662 A1 | 1/1976 |
| WO | 2004/071979 A2 | 8/2004 |
| WO | 2016/134677 A1 | 9/2016 |

OTHER PUBLICATIONS

Beall et al., "Ion-Exchange in Glass-Ceramics", Frontiers in Materials, vol. 3, Article 41, Aug. 2016, pp. 1-11.
(Continued)

*Primary Examiner* — Karl E Group
(74) *Attorney, Agent, or Firm* — John P. McGroarty

(57) ABSTRACT

A glass-ceramic comprising, in weight percent on an oxide basis, of 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F, wherein the predominant crystalline phase of said glass-ceramic is a trisilicic mica, a tetrasilicic mica, or a mica solid solution between trisilicic and tetrasilicic, and wherein the total of $Na_2O+Li_2O$ is at least 2 wt. %; wherein the glass-ceramic can be ion-exchanged.

21 Claims, 11 Drawing Sheets

(51) Int. Cl.
*C03B 32/02* (2006.01)
*C03C 10/00* (2006.01)
*C03B 25/02* (2006.01)
*C03C 4/18* (2006.01)
*C03C 21/00* (2006.01)

(52) U.S. Cl.
CPC ............ *C03C 4/18* (2013.01); *C03C 10/0009* (2013.01); *C03C 10/0018* (2013.01); *C03C 10/0054* (2013.01); *C03C 10/16* (2013.01); *C03C 21/002* (2013.01); *C03C 2204/00* (2013.01)

(56) References Cited

U.S. PATENT DOCUMENTS

| | | |
|---|---|---|
| 3,732,087 A | 5/1973 | Grossman |
| 3,756,838 A | 9/1973 | Beall |
| 3,801,295 A | 4/1974 | Beall et al. |
| 3,839,055 A | 10/1974 | Grossman |
| 3,997,352 A | 12/1976 | Beall |
| 4,431,420 A | 2/1984 | Adair |
| 4,624,933 A | 11/1986 | Beall et al. |
| 4,652,312 A | 3/1987 | Grossman et al. |
| 4,786,617 A | 11/1988 | Andrieu et al. |
| 4,935,387 A | 6/1990 | Beall et al. |
| 4,948,758 A | 8/1990 | Beall et al. |
| 5,070,043 A | 12/1991 | Amundson et al. |
| 5,246,889 A | 9/1993 | Kasuga et al. |
| 6,080,692 A | 6/2000 | Reise et al. |
| 6,375,729 B1 | 4/2002 | Brodkin et al. |
| 6,645,285 B2 | 11/2003 | Brodkin et al. |
| 9,780,124 B2 | 10/2017 | Yamazaki et al. |
| 10,766,807 B2 * | 9/2020 | Fan ..................... C03C 21/002 |
| 2011/0092353 A1 * | 4/2011 | Amin ..................... C03C 3/118 501/3 |
| 2018/0044225 A1 * | 2/2018 | Fan ..................... C03C 21/005 |
| 2018/0155235 A1 | 6/2018 | Beall et al. |

OTHER PUBLICATIONS

Dana's New Mineralogy, R. V. Gaines et al., eds. (John Wiley & Sons, New York 1997), pp. 1444-1446.

E. El-Meliegy et al., "Glasses and Glass Ceramics for Medical Applications," Springer, New York, N.Y., US 2012 at pp. 156-157.

International Search Report and Written Opinion of the International Searching Authority; PCT/US2020/023238 dated Jul. 6, 2020, 11 pages; European Patent Office.

M. Piska, "Machining today: from theory to applications", Thesis: Bruno University of Technology, 2008.

Malkin et al., "Glass grinding mechanisms and influence on the finished surface and strength", The Science of Ceramic Machining and Surface Finishing II, 1979, pp. 93-106.

Taruta, JNCS, 352 (2006) 5556, "Preparation of Transparent Lithium-Mica Glass ceramics".

* cited by examiner

Mg K series

——— Na2O, mol%, IX 430-1.5 100NaNO3 + 430-0.25 KNO3
—·—·— K2O, mol%, mol%, IX 430-1.5 100NaNO3 + 430-0.25 KNO3

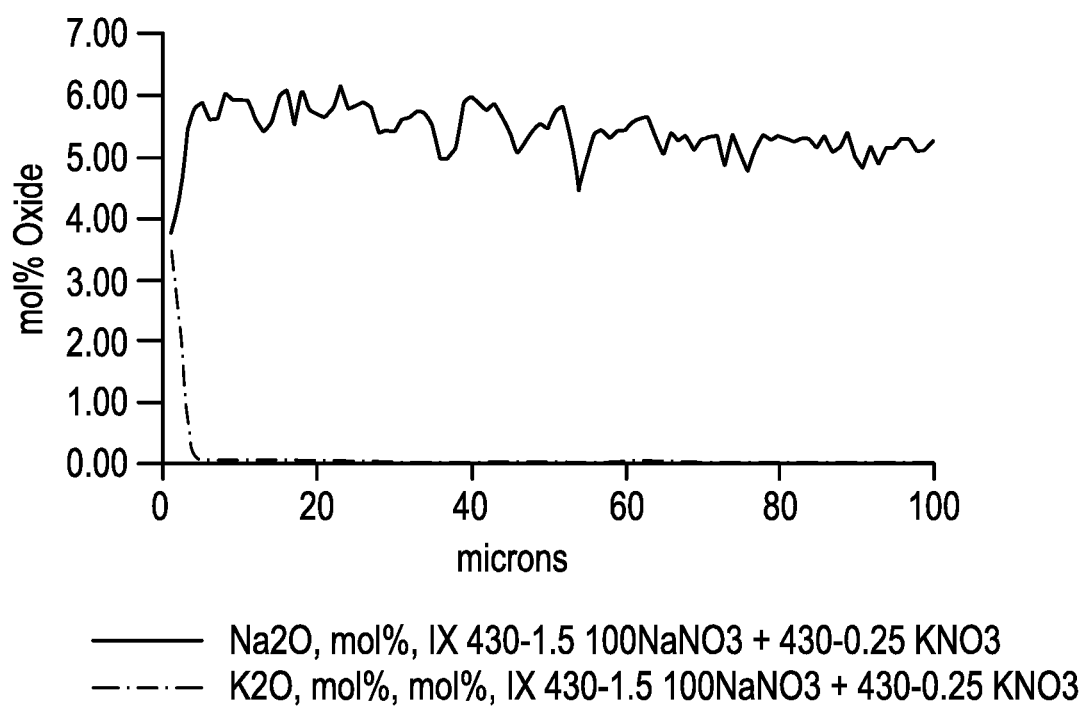

Specific Cutting Energy

Specific Cutting Energy

CHEMICALLY STRENGTHENABLE MACHINABLE GLASS-CERAMICS

CROSS-REFERENCE TO RELATED APPLICATIONS

This application is a national stage entry of International Patent Application Serial No. PCT/US2020/023238 filed on Mar. 18, 2020, which claims the benefit of priority under 35 U.S.C. § 119 of U.S. Provisional Application Ser. No. 62/828,460 filed on Apr. 2, 2019 and the content of each is relied upon and incorporated herein by reference in their entirety.

FIELD

The disclosure relates to machinable glass-ceramics which can be chemically strengthened. In particular, the disclosure relates to glass-ceramics and precursor glasses that are crystallizable to glass-ceramics, which may be strengthened by ion exchange process, methods for making the machinable glass-ceramics and articles including the machinable glass-ceramics.

BACKGROUND

The following discussion is provided to aid the reader in understanding the disclosure and is not admitted to describe or constitute prior art thereto.

Mica is classified as a phyllosilicate; its basic structural feature is a composite sheet in which a layer of octahedrally-coordinated cations is sandwiched between two identical layers of linked (Si, Al)O$_4$ tetrahedra. The general formula of the mica structure can be found in Dana's New Mineralogy, R. V. Gaines et al., eds. (John Wiley & Sons, New York 1997), pages 1444-1446 and the structure can be represented as:

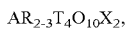

$AR_{2-3}T_4O_{10}X_2$, wherein:
A=a large monovalent or bivalent ion (e.g. Na$^+$, K$^+$, Rb$^+$, Cs$^+$, Ca$^{2+}$, Sr$^{2+}$, Ba$^{2+}$),
R=an octahedrally-coordinated cation (e.g. Li$^+$, Mg$^{2+}$, Fe$^{2+}$, Mn$^{2+}$, Zn$^{2+}$, Al$^{3+}$, Fe$^{3+}$, Mn$^{3+}$, V$^{3+}$),
T=a tetrahedrally-coordinated cation (predominantly Si$^{4+}$, with Al$^{3+}$ and B$^{3+}$), and
X=is an anion (predominantly OH$^-$ in minerals, but F$^-$ in glass-ceramics. X may also be partially O$^{2-}$.)

Micas are extremely common in rocks, and numerous classification systems exist for them. In glass-ceramics, micas are typically classified as alkaline (containing alkali ions) and non-alkaline (containing no monovalent ions), and as trisilicic (where T$_4$ in the formula above is (Si$_3$Al)) and tetrasilicic (Si$_4$). These compositional parameters can be varied to produce desired properties in a glass-ceramic.

Mica based glass-ceramics exhibit high machinability along with good heat resistance, mechanical strength and electrical insulation properties. U.S. Pat. No. 2,920,971, a basic patent in the area of glass-ceramics, provides an extensive study of the practical aspects and theoretical considerations in the manufacture of glass-ceramics. Further, machinable mica and fluoromica glass-ceramics are described in, for example, U.S. Pat. Nos. 3,689,293, 3,732,087, 3,839,055, 3,756,838, 3,997,352, 4,431,420, 4,624,933, 4,652,312, 4,935,387 and 4,948,758, the contents of each of these are relied upon and incorporated herein by reference in their entirety. MACOR® (Corning Incorporated, Corning, N.Y.) is an example of a high-tech glass-ceramic, which is not only porous and virtually impervious to electricity and heat, but which can be readily and accurately machined using conventional metalworking tools within tight tolerances. More recent disclosures of machinable glass-ceramics (e.g., glass-ceramics for dental applications) include PCT International Publication No. WO 2004/071979 A2 and U.S. Pat. Nos. 6,645,285, 6,375,729, 6,645,285, and 5,246,889.

The prior machinable glass ceramics, while valuable and useful for various applications, do not possess the capability of being chemically strengthened, for example by ion exchange, which improves their mechanical strength. Thus, there remains a need for new machinable glass-ceramics which can be chemically strengthened and have high crystallinity, and mechanical strength, as well as improved optical characteristics.

SUMMARY OF THE INVENTION

In one aspect, provided is a glass-ceramic comprising, in weight percent on an oxide basis, of 50 to 70% SiO$_2$, 0 to 20% Al$_2$O$_3$, 12 to 23% MgO, 0 to 4% Li$_2$O, 0 to 10% Na$_2$O, 0 to 10% K$_2$O, 0 to 5% ZrO$_2$, and 2 to 12% F, wherein the predominant crystalline phase of said glass-ceramic is a trisilicic mica and/or tetrasilicic mica, or a mica solid solution between trisilicic and tetrasilicic, and wherein the total of Na$_2$O+Li$_2$O is at least 2 wt. %; wherein the glass-ceramic can be ion-exchanged.

In another aspect, provided is a glass-ceramic comprising, by weight percent on an oxide basis, 60 to 70% SiO$_2$, 0 to 2% Al$_2$O$_3$, 15 to 20% MgO, 2 to 10% Na$_2$O, 0 to 10% K$_2$O, 0 to 3% Li$_2$O, 0 to 5% ZrO$_2$, and 3 to 7% F, wherein the predominant crystalline phase of said glass-ceramic is a tetrasilicic mica; wherein the glass-ceramic can be ion-exchanged.

In yet another aspect, provided is a glass-ceramic comprising, by weight percent on an oxide basis, 50 to 65% SiO$_2$, 9 to 16% Al$_2$O$_3$, 13 to 21% MgO, 0 to 3% Li$_2$O, 1.5 to 8% Na$_2$O, 0 to 6% K$_2$O, 0 to 3% ZrO$_2$, and 3 to 10% F, wherein the predominant crystalline phase of said glass-ceramic is a trisilicic mica; wherein the glass-ceramic can be ion-exchanged.

In yet another aspect, provided is a glass-ceramic comprising a silicate glass phase; and a crystalline phase predominantly consisting of a trisilicic mica and/or tetrasilicic mica, or a mica solid solution between trisilicic and tetrasilicic.

In certain embodiments, which are combinable with the above aspects, the glass-ceramics are ion-exchanged. In certain embodiments, which are combinable with the above aspects, the glass-ceramics are machinable glass-ceramics.

In certain embodiments, which are combinable with the above aspects, the glass-ceramic comprise ion-exchanged glass-ceramics. In certain embodiments, which are combinable with the above aspects, the ion-exchanged glass-ceramic has a depth of ion penetration of about 3% to about 23% of thickness.

In certain embodiments, which are combinable with the above embodiments and aspects, the glass-ceramic has an average grain size of 20 microns or less. In certain embodiments, which are combinable with the above embodiments and aspects, the glass-ceramic has an average grain size of 2 microns or less. In certain embodiments, which are combinable with the above embodiments and aspects, the glass-ceramic comprises from about 30 wt. % to about 80 wt. % crystalline phase. In certain embodiments, which are combinable with the above embodiments and aspects, the glass-ceramic has a density of about 2 g/cc to about 3 g/cc. In certain embodiments, which are combinable with the above embodiments and aspects, the glass-ceramic has a Young's modulus of about 60 GPa to about 70 Gpa. In certain embodiments, which are combinable with the above embodiments and aspects, the glass-ceramic has a Shear modulus of about 18 GPa to about 30 Gpa. In certain embodiments, which are combinable with the above embodiments and aspects, the glass-ceramic according to any one of the preceding claims, having a fracture toughness of about 1 MPa·m$^{0.5}$ to about 5.0 MPa·m$^{0.5}$. In certain embodiments, which are combinable with the above embodiments and aspects, the glass-ceramic has a Vickers hardness of about 100 kgf to about 400 kgf. In certain embodiments, which are combinable with the above embodiments and aspects, the glass-ceramic has a Knoop Hardness of about 150 kg/mm$^2$ to about 300 kg/mm$^2$. In certain embodiments, which are combinable with the above embodiments and aspects, the glass-ceramic has a Moh's hardness of about 3 to about 7. In certain embodiments, which are combinable with the above embodiments and aspects, the glass-ceramic has an opacity of ≥80% for a 1 mm thickness over the wavelength range from about 380 nm to about 740 nm. In certain embodiments, which are combinable with the above embodiments and aspects, the glass-ceramic has a Poisson's ratio of about 0.2 to about 0.3. In certain embodiments, which are combinable with the above embodiments and aspects, the glass-ceramic has a mechanical strength greater than 100 MPa. In certain embodiments, which are combinable with the above embodiments and aspects, the glass-ceramic has a porosity of 0-10%.

In another aspect, provided is an article comprising the glass-ceramic comprising, in weight percent on an oxide basis, of 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F, wherein the predominant crystalline phase of said glass-ceramic is a trisilicic mica and/or tetrasilicic mica, or a mica solid solution between trisilicic and tetrasilicic, and wherein the total of $Na_2O+Li_2O$ is at least 2 wt. %; wherein the glass-ceramic can be ion-exchanged.

In yet another aspect, provided is a method for forming a machinable glass ceramic comprising: melting a batch and forming a glass-ceramic comprising, in weight percent on an oxide basis, of 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F wherein the total of $Na_2O+Li_2O$ is at least 2 wt. %; melting a batch and forming a precursor glass comprising, in weight percent on an oxide basis, of 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F; wherein the total of $Na_2O+Li_2O$ is at least 2 wt. %; annealing the precursor glass at a suitable temperature and for a suitable period of time; ceramming the precursor glass at suitable ceramming schedules and cooling to room temperature; optionally machining the resulting glass ceramic into the desired form; ion exchanging the glass-ceramic by placing the glass article in an alkali ion-containing salt bath exhibiting a temperature sufficiently below the glass strain point and holding it in the salt bath for time sufficient to complete ion exchange of ions in the glass-ceramic; and cooling the ion-exchanged, machinable glass-ceramic to room temperature.

In certain embodiments, which are combinable with the above embodiments and aspects of the method, the alkali-ion containing bath comprises a sodium-ion containing bath, a potassium ion-containing bath, a cesium ion-containing bath, a rubidium ion-containing bath, or a mixture thereof.

In certain embodiments, which are combinable with the above embodiments and aspects of the method the alkali-ion containing bath has a temperature of about 390° C. to about 500° C. In certain embodiments, which are combinable with the above embodiments and aspects of the method, the glass is held in the salt bath for a period of 10 min to 20 h. In certain embodiments, which are combinable with the above embodiments and aspects of the method, the alkali-ion containing bath comprises a single bath or multiple baths comprising KNO3, NaNO3, or a mixture thereof. In certain embodiments, which are combinable with the above embodiments and aspects of the method, the batch of glass is melted at a batch of precursor glasses at a temperature in the range of 1200° C. to 1550° C. for about 30 min to about 16 h. In certain embodiments, which are combinable with the above embodiments and aspects of the method, the annealing is conducted at a temperature of about 500° C. to about 650° C. In certain embodiments, which are combinable with the above embodiments and aspects of the method, the ceramming schedule includes nucleation at about 700° C. to about 820° C. for about 2-8 h and growth at 900° C. to about 1100° C. for 2-8 h at a ramp rate of about 1 to about 10° C./min. In certain embodiments, which are combinable with the above embodiments and aspects of the method, the ion exchanging is a multi-step process conducted using multiple alkali ion-containing salt baths. In certain embodiments, which are combinable with the above embodiments and aspects of the method, the ion exchanging is conducted by placing the glass article in a sodium ion-containing salt bath and a potassium-ion containing bath. In certain embodiments, which are combinable with the above embodiments and aspects of the method, the glass ceramic is ion-exchanged to produce a compressive stress spike at the surface, the depth of the spike extending in a range of 0.3% to 3% of the thickness glass-ceramic article.

BRIEF DESCRIPTION OF THE DRAWINGS

FIGS. 8B and 8C are graphs showing the evolution of the $Na_2O$ and $K_2O$ profile as a function of depth after two-step ion exchange in $NaNO_3$ and $KNO_3$ at 430° C. for Composition PR.

Figure 1:
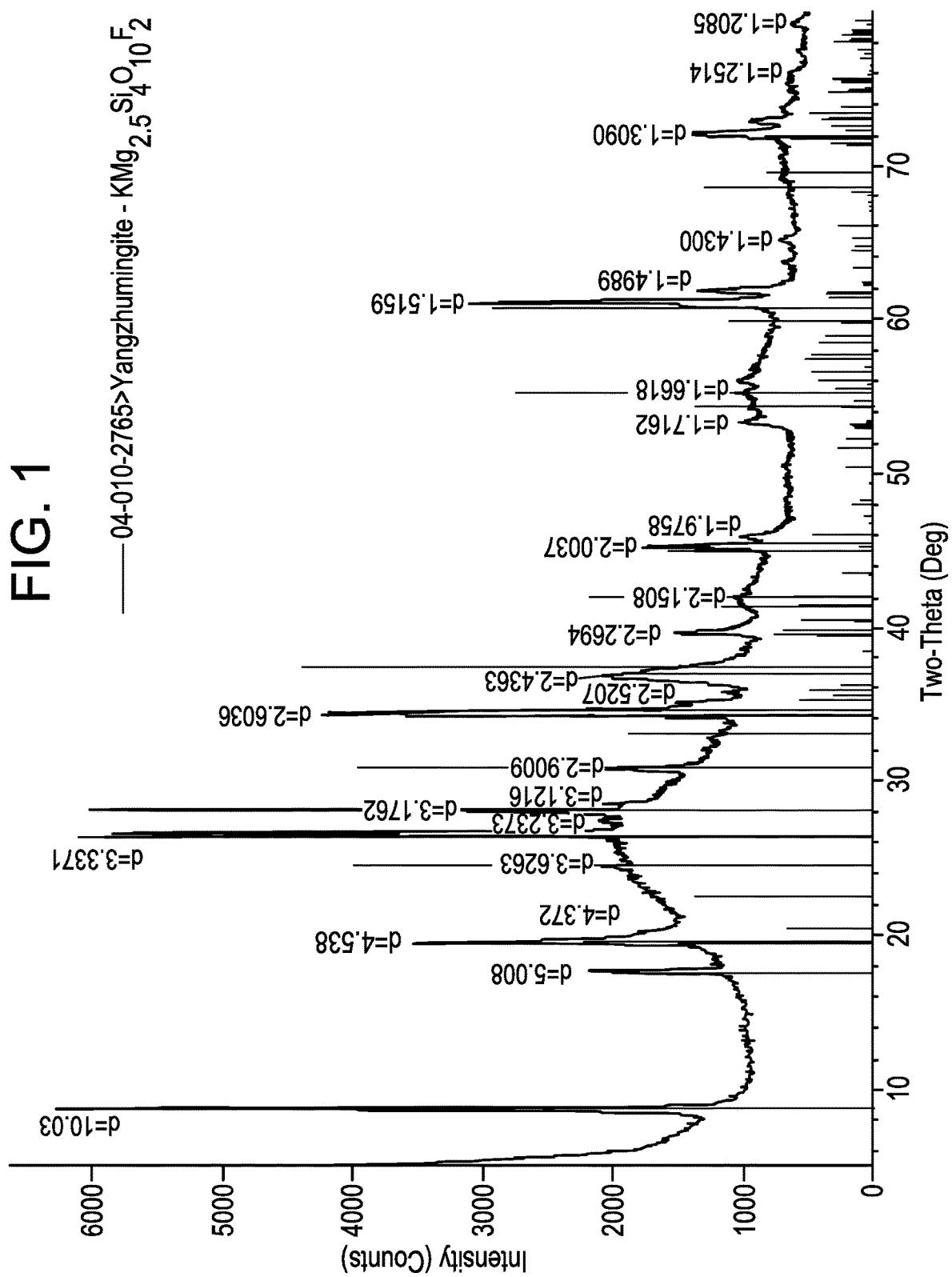
FIG. 1 is an XRD of tetrasilicic mica ($KMg_{2.5}Si_4O_{10}F_2$-Yangzhumingite) glass-ceramic.

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The present disclosure provides a new family of glass-ceramics incorporating mica and optionally a second crystalline phase. The compositions allow for chemical strengthening, such as ion exchange strengthening, by ion exchange of either one of the crystalline phases or the residual glass, or both. These GC materials have machinability comparable to that of known materials such as MACOR® and yet can be ion exchanged in Na, K or mixed ion exchange baths at modest temperatures and times, which increases their strength significantly. The GCs of the present technology also exhibit optical translucency to opacity.

Compositions

Various aspects and/or embodiments of this disclosure relate chemically strengthable, machinable glass-ceramics (GCs), precursor glass (PG) compositions and/or glass-ceramic articles which are capable of, adapted to ion-exchange or which are ion-exchanged. Other aspects and/or embodiments relate to an article including the chemically strengthable, machinable, glass-ceramics and/or precursor glass compositions. The glass-ceramic materials may include crystalline phases of fluorphlogopite, phlogopite, yangzhumingite, fluorrichterite, β-spodumene, taeniolite, enstatite, hectorite or a combination. Enstatite ($MgSiO_3$) phase which is known to increase hardness, and in some glass-ceramics, toughness, may be present in the compositions. Enstatite may also be a factor in preventing grain growth of the mica. Chemically strengthable includes for example, ion-exchangeable. The glass-ceramics and/or precursor glass compositions may be ion exchangeable. The glass-ceramics, precursor glass compositions and/or glass-ceramic articles may be characterized as translucent and/or opaque.

In one aspect, provided herein are glass-ceramics which include a silicate glass phase; and a crystalline phase predominantly consisting of a trisilicic mica and/or tetrasilicic mica, or a mica solid solution between trisilicic and tetrasilicic. In certain embodiments, the glass-ceramics may be machinable. In certain embodiments, the glass-ceramics disclosed herein may not be particularly machinable. In certain embodiments, the glass-ceramics may be ion-exchanged.

The machinable glass-ceramics, precursor glass compositions and/or glass-ceramic articles that includes such a composition of some may include, in weight percent on an oxide basis, $SiO_2$ in the range from 50 to 80; $Al_2O_3$ in the range from 10 to 20; MgO in the range from 0 to 5; $Li_2O$ in the range from 0 to 10; $Na_2O$ in the range from 0 to 10; $ZrO_2$ in the range from 0 to 5; and F in the range from 2 to 10, and wherein the total of $Na_2O+Li_2O$ is at least 2 wt. %. In some embodiments, the machinable glass-ceramic comprises or consists $B_2O_3$ in the range from 0 wt. %, to 5 wt. %. In certain embodiments, the glass-ceramic is free of $P_2O_5$. In certain embodiments, the glass-ceramic does not contain $P_2O_5$.

In certain embodiments, the machinable glass-ceramic comprises or consists of, in weight percent on an oxide basis, of 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F, wherein the predominant crystalline phase of said glass-ceramic is a trisilicic mica and/or tetrasilicic mica, or a mica solid solution between trisilicic and tetrasilicic, and wherein the total of $Na_2O+Li_2O$ is at least 2 wt. %.

In some embodiments, the machinable glass-ceramic comprises or consists of, by weight percent on an oxide basis, 60 to 70% $SiO_2$, 0 to 2% $Al_2O_3$, 15 to 20% MgO, 2 to 10% $Na_2O$, 0 to 10% $K_2O$, 0 to 3% $Li_2O$, 0 to 5% $ZrO_2$, and 3 to 7% F, wherein the predominant crystalline phase of said glass-ceramic is a tetrasilicic mica.

In other embodiments, the machinable glass-ceramic comprises or consists of, by weight percent on an oxide basis, 50 to 65% $SiO_2$, 9 to 16% $Al_2O_3$, 13 to 21% MgO, 0 to 3% $Li_2O$, 1.5 to 8% $Na_2O$, 0 to 6% $K_2O$, 0 to 3% $ZrO_2$, and 3 to 10% F, wherein the predominant crystalline phase of said glass-ceramic is a trisilicic mica.

In one or more embodiments, the machinable glass-ceramic described herein can be ion-exchanged. In one or more embodiments, the machinable glass-ceramic described herein are ion-exchanged. In one or more embodiments, the machinable glass-ceramic comprise or consists of ion-exchanged glass ceramic.

In certain embodiments, $SiO_2$ may serve as the primary glass-forming oxide. Accordingly, In some embodiments, $SiO_2$ may be present in the machinable glass-ceramics, precursor glass compositions and/or glass-ceramic articles that includes such a composition described herein, in wt. % in the range from about 50 to about 80, including from about 55 to about 80, from about 60 to about 80, from about 65 to about 80, from about 50 to about 75, from about 55 to about 75, from about 60 to about 75, from about 65 to about 75, from about 50 to about 70, from about 55 to about 70, from about 60 to about 70, from about 65 to about 70, from about 50 to about 68, from about 55 to about 68, from about 60 to about 68, from about 65 to about 68, from about 50 to about 65, from about 55 to about 65, from about 60 to about 65, from about 50 to about 60, from about 52 to about 60, from about 55 to about 60, from about 56 to about 60, from about 57 to about 60, from about 58 to about 60, from about 59 to about 60, from about 62 to about 70, from about 62 to about 69, from about 62 to about 68, from about 62 to about 67, from about 62 to about 66, from about 62 to about 65, or any range including and/or in-between any two of these values.

The machinable glass-ceramics, precursor glass compositions and/or glass-ceramic articles may or may not include $Al_2O_3$. Accordingly, In some embodiments, $Al_2O_3$ may be present in the machinable glass-ceramics, precursor glass compositions and/or glass-ceramic articles that includes such a composition described herein, in wt. % in the range from about 0 to about 20, including from about 0 to about 5, from about 0 to about 2, from about 1 to about 20, from about 5 to about 20, from about 8 to about 20, from about 10 to about 20, from about 11 to about 20, from about 0 to about 15, from about 1 to about 15, from about 5 to about 15, from about 10 to about 15, from about 0 to about 14, from about 3 to about 14, from about 5 to about 14, from about 8 to about 14, from about 10 to about 18, from about 10 to about 16, from about 10 to about 15, from about 10 to about 14, from about 10 to about 13, from about 11 to about 18, from about 11 to about 16, from about 11 to about 15, or from about 11 to about 14, or any range including and/or in-between any two of these values.

In certain embodiments, the machinable glass-ceramics, precursor glass compositions and/or glass-ceramic articles include one or more alkali metal oxides (e.g., $Li_2O$, $Na_2O$, $K_2O$) that are collectively (i.e., $Na_2O+K_2O+Li_2O$) present, in wt. % in an amount in the range from about 4 to about 30, from about 4 to about 25, from about 4 to about 20, from about 4 to about 18, from about 4 to about 16, from about 4 to about 14, from about 4 to about 12, from about 4 to about 10, from about 6 to about 30, from about 6 to about 20, from about 6 to about 15, from about 8 to about 30, from about 8 to about 20, from about 8 to about 15, from about 4 to about 15, from about 5 to about 15, from about 6 to about 15, from about 8 to about 15, or any range including and/or in-between any two of these values.

In certain embodiments, the machinable, ion-exchangeable glass-ceramics, precursor glass compositions and/or glass-ceramic articles may include at least 2 wt. % $Na_2O+Li_2O$. In some embodiments, the machinable, ion-exchangeable glass-ceramics, precursor glass compositions and/or glass-ceramic articles may include, in wt. % in an amount in the range from about 2 to about 30, from about 2 to about 25, from about 2 to about 20, from about 2 to about 18, from about 2 to about 16, from about 2 to about 14, from about 2 to about 12, from about 2 to about 10, about 4 to about 30, from about 4 to about 25, from about 4 to about 20, from about 4 to about 18, from about 4 to about 16, from about 4 to about 14, from about 4 to about 12, from about 4 to about 10, from about 6 to about 30, from about 6 to about 20, from about 6 to about 15, from about 8 to about 30, from about 8 to about 20, from about 8 to about 15, from about 4 to about 15, from about 5 to about 15, from about 6 to about 15, from about 8 to about 15, or any range including and/or in-between any two of these values.

In some embodiments, the alkali oxide present in the machinable glass-ceramics, precursor glass compositions and/or glass-ceramic articles is $Na_2O$, which may be present, in wt. % in an amount in the range from about 1 to about 20, from about 2 to about 20, from about 3 to about 20, from about 5 to 20, from about 1 to about 15, from about 2 to about 15, from about 3 to about 15, from about to 8 to about 15, from about 1 to about 10, from about 2 to about 10, from about 3 to about 10, from about 5 to about 10, from about to 8 to about 10, from about 1 to about 8, from about 2 to about 8, from about 3 to about 8, from about 4 to about 8, from about 5 to about 8, from about 6 to about 8, from about 7 to about 8, from about 1 to about 5, from about 2 to about 5, from about 2 to about 4, or from about 2 to about 3, or any range including and/or in-between any two of these values.

In some embodiments, the alkali oxide present in the machinable glass-ceramics, precursor glass compositions and/or glass-ceramic articles is $K_2O$, which may be present, in wt. % in the range from about 0 to about 20, from about 1 to about 20, from about 2 to about 20, from about 3 to about 20, from about 5 to 20, about 0 to about 15, from about 1 to about 15, from about 2 to about 15, from about 3 to about 15, from about 5 to about 15, from about to 8 to about 15, about 0 to about 10, from about 1 to about 10, from about 2 to about 10, from about 3 to about 10, from about 4 to about 10, from about 5 to about 10, from about to 8 to about 10, about 0 to about 8, from about 1 to about 8, from about 2 to about 8, from about 3 to about 8, from about 4 to about 8, from about 5 to about 8, from about 6 to about 8, from about 7 to about 8, about 2 to about 7, from about 2 to about 6, from about 2 to about 5, from about 2 to about 4, or from about 2 to about 3, about 3 to about 4, from about 4 to about 5, from about 5 to about 6, or any range including and/or in-between any two of these values.

In some embodiments, the alkali oxide present in the machinable glass-ceramics, precursor glass compositions and/or glass-ceramic articles is $Li_2O$, which may be present, in wt. % in an amount in the range from about 0 to about 10, including from about 0.01 to about 10, from about 0.1 to about 10, from about 1 to about 10, from about 2 to about 10, from about 3 to about 10, from about 4 to about 10, from about 0.01 to about 8, from about 0.1 to about 8, from about 1 to about 8, from about 2 to about 8, from about 3 to about 8, from about 5 to about 8, from about 0.01 to about 5, from about 0.1 to about 5, from about 1 to about 5, from about 2 to about 5, from about 3 to about 5, from about 0.01 to about 4, from about 1 to about 4, from about 1.5 to about 4, from about 2 to about 4, from about 0.01 to about 3, from about 1 to about 3, from about 1.5 to about 3, from about 1.8 to about 3, from about 2 to about 3, from about 0.01 to about 2.5, from about 0.5 to about 2.5, from about 1 to about 2.5, from about 1.2 to about 2.5, from about 1.3 to about 2.5, from about 1.4 to about 2.5, from about 1.5 to about 2.5, from about 0.01 to about 2.2, from about 0.1 to about 2.2, from about 0.5 to about 2.2, from about 1 to about 2.2, from about 1.2 to about 2.2 from about 1.5 to about 2.2, from about 1.8 to about 2.2, from about 2 to about 2.2, or any range including and/or in-between any two of these values. In some embodiments, $Li_2O$ is used as a primary alkali during ion-exchange process.

In certain embodiments, the machinable glass-ceramics, precursor glass compositions and/or glass-ceramic articles include MgO, which may be present, in wt. %, in an amount in the range from about 5 to about 35, from about 5 to about 30, from about 5 to about 25, from about 5 to about 20, from about 10 to about 35, from about 10 to about 30, from about 10 to about 25, from about 10 to about 20, from about 14 to about 20, from about 15 to about 20, from about 16 to about 20, from about 17 to about 20, from about 18 to about 20, from about 19 to about 10, from about 15 to about 19, from about 15 to about 18, from about 15 to about 17, from about 15 to about 16, from about 16 to about 19, from about 16 to about 18, from about 16 to about 17, from about 17 to about 19, or from about 17 to about 18, or any range including and/or in-between any two of these values.

In certain embodiments, the machinable glass-ceramics, precursor glass compositions and/or glass-ceramic articles include $ZrO_2$, which may be present, in wt. %, in the range from about 0 to about 10, from about 0 to about 8, from about 0 to about 7, from about 0 to about 6, from about 0 to about 5, from about 0 to about 4, from about 0 to about 3.5, from about 0 to about 3, from about 0 to about 2.5, from about 0 to about 2, from about 0 to about 1.5, from about 0 to about 1, from about 0 to about 0.5, from about 0.1 to about 5, from about 0.1 to about 4, from about 0.1 to about 3.5, from about 0.1 to about 3, from about 0.1 to about 2.5, from about 0.1 to about 2, from about 0.1 to about 1.5, from about 0.1 to about 1, from about 0.5 to about 4.5, from about 1 to about 4, from 1.5 to about 3.5, or from about 2 to about 3, or any range including and/or in-between any two of these values.

In certain embodiments, the machinable glass-ceramics, precursor glass compositions and/or glass-ceramic articles include F, which may be present, in wt. %, in the range from about 1 to about 12, including from about 1 to about 10, from about 1 to about 8, from about 1 to about 7, from about 1 to about 6, from about 1 to about 5, from about 1 to about 4, from about 3 to about 10, from about 3 to about 9, from about 3 to about 8, from about 3 to about 7, from about 3 to about 6, from about 3 to about 5, from about 5 to about 10, from about 5 to about 9, from about 5 to about 8, from about 5 to about 7, from about 5 to about 6, from about 6 to about 10, from about 6 to about 9, from about 6 to about 8, from about 6 to about 7, from about 7 to about 10, from about 7 to about 9, from about 7 to about 8, from about 8 to about 10, from about 8 to about 9, from about 5 to about 5.5, from about 5.5 to about 6, from 6.5 to about 7, or from about 7.5 to about 8, or any range including and/or in-between any two of these values.

In certain embodiments, the machinable glass-ceramics, precursor glass compositions and/or glass-ceramic articles may optionally include $B_2O_3$. For example, $B_2O_3$ may be present, in wt. %, in the range from about 0 to about 5, from about 0 to about 4, from about 0 to about 3.5, from about 0 to about 3, from about 0 to about 2.5, from about 0 to about 2, from about 0 to about 1.5, from about 0 to about 1, from about 0 to about 0.5, from about 0.1 to about 5, from about 0.1 to about 4, from about 0.1 to about 3.5, from about 0.1 to about 3, from about 0.1 to about 2.5, from about 0.1 to about 2, from about 0.1 to about 1.5, from about 0.1 to about 1, from about 0.5 to about 4.5, from about 1 to about 4, from 1.5 to about 3.5, or from about 2 to about 3, or any range including and/or in-between any two of these values.

In some embodiments, the predominant crystalline phase may include a trisilicic mica or tetrasilicic mica, including, but not limited to fluorphlogopite, yangzhumingite, and fluorrichterite, or a combination thereof. For example, in some embodiments an yangzhumingite crystalline phase may comprise the predominant crystalline phase in the machinable glass-ceramic. In other embodiments, a fluorophlogopite crystalline phase may comprise the predominant crystalline phase in the machinable glass-ceramic articles. In other embodiments, a fluorrichterite crystalline phase may comprise the predominant crystalline phase in the machinable glass-ceramic articles. In yet other embodiments, a combination of a yangzhumingite and a fluorrichterite crystalline phase may comprise the predominant crystalline phase in the machinable glass-ceramic articles. In certain embodiments, the machinable glass-ceramics may include one or more of fluorphlogopite, phlogopite, yangzhumingite, fluorrichterite, β-spodumene, taeniolite, enstatite, hectorite or a combination thereof as the crystalline phase.

In certain embodiments, at least a portion of a surface of the machinable glass-ceramics and/or precursor glasses can be chemically strengthened, for example, by an ion-exchange process. In some embodiments, at least a portion of the surface and/or bulk of the machinable glass-ceramics and/or precursor glasses described herein are ion exchangeable or capable or adaptable to undergo ion-exchange process to provide an ion-exchange glass-ceramic or ion-exchanged glass. The mechanism and effect of ion-exchange (IOX) in glass-ceramics has been described by G. Beall et al., in "Ion Exchange in Glass-Ceramics," *Frontiers in Materials*, Vol. 3, id. 41 (2016).

In another aspect, the present technology relates to the precursor glass compositions and glasses utilized to form the machinable glass-ceramics described herein. The machinable glass-ceramics according to some may be formed from a glass, such as a trisilicic or tetrasilicic glass, having a precursor glass composition as otherwise described herein with respect to the machinable glass-ceramics.

In another embodiment the machinable glass-ceramics of the invention may also be colored to an appropriate colored using colorants known in the art. Colorants in the form of metallic ions may be included in order to impart various colors or tints to the glass. Specifically, those metallic ions which can achieve this colorant feature include those transition metal ions selected from the group consisting of $Co^{2+}$, $Ni^{2+}$, $Cr^{3+}$, $Cu^{1+}$, $Fe^{3+}$, $Cd^{2+}$, $Sn^{4+}$, $Mn^{4+}$, $Sb^{3+}$, $In^{3+}$, $Bi^{3+}$, $V^{3+}$, and $Ta^{5+}$. The colorants are added in an amount in the range of greater than 0 wt. % to less than or equal to 3 wt. %. The colorants, when added, may replace part of the $SiO_2$, $Al_2O_3$ and/or MgO. The glass-ceramics may also include oxides of titanium, cerium, tin, iron, and the like.

In another aspect, provided are articles comprising the machinable glass-ceramics disclosed herein. In yet another aspect, provided is an article comprising the machinable glass-ceramic comprising, in weight percent on an oxide basis, of 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F, wherein the predominant crystalline phase of said glass-ceramic is a trisilicic mica and/or tetrasilicic mica, or a mica solid solution between trisilicic and tetrasilicic, and wherein the total of $Na_2O+Li_2O$ is at least 2 wt. %; wherein the glass-ceramic can be ion-exchanged.

Properties

The glass-ceramics described herein are machinable, ion-exchangeable and in some embodiments, are substantially translucent or opaque, glass-ceramics. These glass-ceramics, show a high crystallinity and high mechanical strength. In some embodiments, the glass-ceramics described herein exhibited comparable machinability and higher mechanical strength than commercially available glass-ceramics such as MACOR®. The high strength of the glass-ceramics of the invention is believe to be attributable to the ion-exchangeability of the glass-ceramics described herein. The ion-exchange leads to the formation of a compressive stress layer which leads to improved mechanical properties, including strength, hardness, indentation, fracture-resistant properties, anti-scratch properties, and the like.

In one aspect the present technology is directed to a high strength glass-ceramic having a high degree of crystallinity. The glass-ceramics of the present technology may have about 30 to about 85 wt. % crystalline phase, including, but not limited to about 50 to about 85 wt. %, about 55 to about 80 wt. %, or about 60 to about 75 wt. %. In some embodiments, the machinable glass-ceramics of the present technology may have greater than 50 wt. %, greater than 60 wt. %, or greater than 80 wt. % crystalline phase, the remainder percentage being the glass phase) In some embodiments, the crystalline phase may have greater than 50 wt. % crystalline phase and the remainder percentage being non-crystalline (glass) phase. In one embodiment glass-ceramics have a greater than 60 wt. % crystalline phase and less than 40 wt. % glass phase. In a further embodiment the machinable glass-ceramics have a greater than 75 wt. % crystalline phase and less than 25 wt. % glass phase. In still further embodiment the machinable glass-ceramics have a greater than 80 wt. % crystalline phase and less than 20 wt. % glass phase.

The machinable glass-ceramics, precursor glass compositions and/or glass-ceramic articles described herein may be subjected to various characterization processes including machinability index analysis, density, strain point, annealing point, compressive stress profiles, failure stress, fracture toughness, brittleness factor, Vickers hardness, Knoop hardness, Moh's hardness, G-ratio, CIELAB color space coordinates, translucency, opacity, viscosity, density, Poisson's ratio, elemental profiles, crystalline phase identification, crystal sizes, dielectric parameters, etc. using standard methods known in the art, such as those described in U.S. Pat. No. 9,780,124, the contents of which are relied upon and incorporated herein by reference in their entirety. Fracture toughness values refer to indentation and/or Chevron notch measurements. Brittleness ratio values refer to measurements of hardness and fracture toughness. The measurements are known and one of skill in the art could readily select an appropriate test methodology to determine the modulus, hardness, fracture toughness, and/or brittleness ratio of a particular material.

The machinable glass-ceramics, precursor glass compositions and/or glass-ceramic articles described herein described herein may exhibit superior mechanical, electrical and optical properties. For example, the machinable glass-ceramics, precursor glass compositions and/or glass-ceramic articles described herein may have one or more of the following properties: a low density range of about 2 g/cc to about 3 g/cc, Young's Modulus with a value in the range of about 60 GPa to about 70 GPa; porosity of 0 to 10%; shear modulus with a value in the range of about 18 Gpa to about 30 GPa; a Poisson's ratio in the range of about 0.2 to about 0.3; fracture toughness in the range of about 1 MPa·m$^{0.5}$ to about 5.0 MPa·m$^{0.5}$; hardness with a Knoop value in the range of about 150 kg/mm$^2$ to about 300 kg/mm$^2$; Vickers hardness in the range of about 100 kgf to about 400 kgf; Moh's hardness in the range of about 3 to about 7; theoretical failure stress (sqrt((G*E)/(pi*m)), m=1 mm) in the range of about 20 MPa to about 50 Mpa; average grain size of less than 20 microns, such as from about 100 nanometers to about 20 microns; color coordinates in the CIELAB color space of the following ranges: i. L*=from about 80 to about 100; ii. a*=from about −2 to about 2; and iii. b*=from about −8 to about 3.

In certain embodiments, the glass ceramics have a density range of about 2 g/cc to about 3 g/cc, including without limitation, about 2.05 g/cc to about 2.95 g/cc, about 2.25 g/cc to about 2.85 g/cc, about 2.35 g/cc to about 2.75 g/cc, about 2.45 g/cc to about 2.65 g/cc, or about 2.55 g/cc to about 2.57 g/cc, or any range including and/or in-between any two of these values. In certain embodiments, the glass ceramics have a Young's Modulus with a value in the range of about 55 GPa to about 75 Gpa, including, without limitation, about 55 Gpa to about 72 Gpa, about 56 Gpa to about 72 Gpa, about 57 Gpa to about 71 Gpa, about 58 pa to about 70 Gpa, about 59 Gpa to about 69 Gpa, about 60 Gpa to about 68 Gpa, about 61 Gpa to about 67 Gpa, about 62 Gpa to about 66 Gpa, or about 63 Gpa to about 65 Gpa or any range including and/or in-between any two of these values. In certain embodiments, the glass ceramics have a shear modulus with a value in the range of about 15 Gpa to about 35 Gpa, including, but not limited to about 18 Gpa to about 30 Gpa, about 20 Gpa to about 29 Gpa, about 21 Gpa to about 28 Gpa, about 22 Gpa to about 27.3 Gpa, about 22.5 Gpa to about 27 Gpa, about 23 Gpa to about 26.6 Gpa, about 24 Gpa to about 26.1 Gpa, or about 25 Gpa to about 25.8 Gpa or any range including and/or in-between any two of these values.

In certain embodiments, the glass ceramics have a porosity of 0 to 10%, including, but not limited to about 0.1% to about 10%, about 0.5% to about 8%, about 0.75% to about 6%, about 1% to about 4%, or about 2% to about 3%, or any range including and/or in-between any two of these values. In certain embodiments, the glass ceramics have a Poisson's ratio in the range of about 0.2 to about 0.3, including, but not limited to from about 0.21 to about 0.29, about 0.22 to about 0.28, about 0.23 to about 0.27, about 0.24 to about 0.26, about 0.247 to about 0.252, or any range including and/or in-between any two of these values. In certain embodiments, the glass ceramics have a fracture toughness in the range of about 1 MPa·m$^{0.5}$ to about 5.0 MPa·m$^{0.5}$, including, but not limited to about 1.2 MPa·m$^{0.5}$ to about 4.5 MPa·m$^{0.5}$, about 1.3 MPa·m$^{0.5}$ to about 4.0 MPa·m$^{0.5}$, about 1.4 MPa·m$^{0.5}$ to about 3.5.0 MPa·m$^{0.5}$, about 1.5 MPa·m$^{0.5}$ to about 3.0 MPa·m$^{0.5}$, about 1.7 MPa·m$^{0.5}$ to about 2.5 MPa·m$^{0.5}$, about 1.9 MPa·m$^{0.5}$ to about 2.35 MPa·m$^{0.5}$, or any range including and/or in-between any two of these values. In certain embodiments, the glass ceramics have a failure stress in the range of about 20 MPa to about 50 Mpa, including, but not limited to about 22 MPa to about 45 Mpa, about 23 MPa to about 42 Mpa, about 25 MPa to about 40 Mpa, about 26 MPa to about 36 Mpa, about 27 MPa to about 34 Mpa, about 29 MPa to about 32 Mpa, or any range including and/or in-between any two of these values. In certain embodiments, the glass ceramics have an average grain size (length) of less than 20 microns, such as from about 100 nanometers to about 20 microns, about 500 nanometers to about 18 microns, about 1 micron to about 15 microns, about 3 microns to about 12 microns, about 5 microns to about 10 microns, about 6.5 microns to about 8.5 microns, about 7 microns to about 8 microns, about 1 to 5 microns, about 0.01 to 2 microns, about 0.1 to 2 microns, about 0.5 to 2 microns, about 1 to about 2 microns, about 1 to about 3 microns, or about 2 to about 3 microns, or any range including and/or in-between any two of these values. In certain embodiments, the glass ceramics have an average grain size (length) of less than 2 microns. In certain embodiments, the glass ceramics include grains or particles having an aspect ratio in the range of about 1 to 10 or 2 to 10 (e.g., 2:1 to 10:1), including, an aspect ratio of from about 2 to 8, about 3 to 7, about 3.5 to 6 or about 4 to 5, or any range including and/or in-between any two of these values.

In certain embodiments, the glass ceramics have a hardness with a Knoop value in the range of about 150 kg/mm$^2$ to about 400 kg/mm$^2$, including, but not limited to about 175 kg/mm$^2$ to about 350 kg/mm$^2$, about 200 kg/mm$^2$ to about 319 kg/mm$^2$, about 250 kg/mm$^2$ to about 313 kg/mm$^2$, about 270 kg/mm$^2$ to about 300 kg/mm$^2$, or about 279 kg/mm$^2$ to about 290 kg/mm$^2$, or any range including and/or in-between any two of these values. In certain embodiments, the glass ceramics have a Vickers hardness in the range of about 100 kgf to about 400 kgf, including, but not limited to about 150 kgf to about 355 kgf, about 170 kgf to about 305 kgf, about 200 kgf to about 290 kgf, or about 225 kgf to about 275 kgf, or any range including and/or in-between any two of these values. In certain embodiments, the machinable, ion-exchanged glass ceramics have a Moh's hardness of about 3 to about 7, including, but not limited to about 3.5 to about 6.5, about 4 to about 6, or about 4.5 to about 5.5, or, or any range including and/or in-between any two of these values.

The machinable glass-ceramics may exhibit excellent anti-scratch properties after ion-exchange. The G-ratio of the ion-exchanged glass-ceramics disclosed herein may be comparable to that of Macor® and magnitudes higher than glass compositions. In certain embodiments, the glass ceramics have a G-ratio of greater than about 5000 when measured using the test described herein. In certain embodiments, the glass ceramics have a G-ratio of greater than about 10000. In certain embodiments, the glass ceramics have a G-ratio of greater than about 15000.

The machinable, ion-exchanged glass-ceramics may exhibit excellent failure stress characteristics which are comparable with other machinable glass compositions. For example, the glass-ceramics exhibit failure stresses, as determined by 4-point bend testing, of about 170 MPa to about 190 MPa, including about 175 MPa to about 186 MPa. In certain embodiments, the machinable glass-ceramics exhibit a failure stress, as determined by 4-point bend testing, of about 175 MPa. In certain embodiments, the machinable glass-ceramics exhibit a failure stress, as determined by 4-point bend testing, of about 186 MPa.

The machinable glass-ceramics, precursor glass compositions and/or glass-ceramic articles described herein may exhibit translucency and/or opaqueness and exhibit an average % opacity of 80% for a 1 mm thickness over the wavelength range from about 380 nm to about 740 nm (visible light wavelength). In some embodiments, the average opacity is 80% or greater, 81% or greater, 82% or greater 83% or greater, greater than about 84%, greater than about 85%, greater than about 86%, greater than about 87%, greater than about 88%, greater than about 89%, greater than about 90%, greater than about 92% and even greater than about 95%, over the visible wavelength range of 380 nm to about 780 nm. Opacity is measured using a contrast ratio method with a spectrophotometer (e.g., X-Rite C-i7). The opacity of samples was measured over both a light colored backing and a dark colored backing.

Quantitative Measurement of Translucency or Opacity of crystallizable glasses, glass-ceramics, ion-exchangeable (IX) glass-ceramics, and/or IX glass-ceramics according to aspects and/or embodiments of this disclosure can be by methods known to those in the art, such as, those described by E. El-Meliegy et al., "Glasses and Glass Ceramics for Medical Applications," Springer, New York, N.Y., US 2012 at pp. 156-157 (9.6.1 Quantitative Measurement of Translucency or Opacity), which is incorporated by reference herein in its entirety.

Methods

In one aspect, provided herein are methods of producing the machinable glass-ceramics, precursor glass compositions and/or glass-ceramic articles described herein.

The machinable glass-ceramics can be produced by methods which include melting a batch of precursor glasses at a suitable temperature, in a suitable melting apparatus for a sufficient period of time to melt the batch of precursor glasses, delivering the molten glass, annealing the glass and ceramming the glasses with a suitable ceramming schedule; and cooling the glass to room temperature.

The pre-cursor glasses are disclosed herein and may include, in weight percent on an oxide basis, of 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F.

Depending on the composition, the precursor glasses can be melted at a temperature in the range of about 800 to about 2000, preferably at a temperature in the range of 1200–1600° C., more preferably at a temperature in the range of about 1400° C. to about 1500° C., in a suitable apparatus, e.g., a covered platinum crucible, or cold crown melter, for a time sufficient to melt the glasses, such as e.g., about 30 min to about 20 h, including about 2 h to about 10 h, about 3 h to about 6 h. After melting and fining, the glasses can be delivered into boules, sheets or slabs and annealed at a temperature of about 500° C. to about 650° C. The annealed glasses can then be cerammed and held at a suitable growth temperature, e.g., of about 900° C. to about 1100° C., following which the resulting materials were left to cool at furnace rate.

The ceramming step may include, for example, nucleation and growth steps. The nucleation step may include heating a furnace from room temperature to a first temperature ranging from about 700° C. to about 850° C., such as from about 760° C. to about 820° C., at a ramp rate ranging from about 1 to about 10° C./min, such as about 5° C./min, and holding the furnace at the first temperature for a time ranging from about 0.5 to about 5 hours, such as from about 2 to about 4 hours, or any range including and/or in-between any two of these values. The growth step may, in certain embodiments, include heating the furnace to a second temperature ranging from about 900° C. to about 1100° C., such as from about 950° C. to about 1050° C., at a ramp rate ranging from about 1 to about 10° C./min, such as about 5° C./min, and holding the furnace at the second temperature for a time ranging from about 2 to about 16 hours, such as from about 4 to about 12 hours, or any range including and/or in-between any two of these values. Other ceramming schedules are known in the art and may be used in accordance with the disclosure to convert the precursor glass into a glass-ceramic.

After heat treatment, the glass-ceramic may be further treated by any conventional method known in the art, for instance, cooling to room temperature, quenching, polishing, milling, etc.

In some embodiments, the method may further include subjecting the machinable glass-ceramic to chemical strengthening process to provide a chemically-strengthened glass-ceramic. In some embodiments, the chemical strengthening method includes subjecting the glass-ceramic article to ion exchange treatment to provide an ion-exchanged glass ceramic-article, after ceramming the glass article or even without ceramming the glass article. In some embodiments, the precursor glass may also be subjected to ion exchange treatment to provide an ion-exchanged glass. The ion-exchange process may be a single step process or a multi-step process and use a single alkali ion bath, multiple baths having same or different alkali-ions, or a bath with a combination of two or more alkali ions. Ion exchange conditions can be tailored to provide a "spike" or to increase the slope of the stress profile at or near the surface. In certain embodiments, the ion exchanging is a multi-step process conducted using multiple alkali ion-containing salt baths. The multiple alkali-ions baths may contain the same or different alkali-ion. For example, in a two-step process, a first bath may be a sodium-ion containing bath and a second bath may be a potassium-ion containing bath, or vice-versa. The ion exchanging may be conducted by placing the glass article in a sodium ion-containing salt bath followed by a potassium ion containing bath, or vice-versa. Using such multi-step and/or multi-bath and multi-ion bath process, the glass ceramic is ion-exchanged to produce a compressive stress spike at the surface, the depth of the spike extending in a range of 0.3% to 3% of the thickness glass-ceramic article.

For the ion-exchange process, the machinable glass-ceramic may be immersed in a molten salt bath for a predetermined period of time. Suitable salts for the molten salt bath may include one or more alkali metal salts such as, but not limited to, one or more halides, carbonates, chlorates, nitrates, sulfites, sulfates, or combinations of two or more of the proceeding. Suitable alkali metals are known in the art and may include, e.g., sodium, potassium, cesium, rubidium, and the like. In one example, suitable alkali metal salts can include potassium nitrate ($KNO_3$), sodium nitrate ($NaNO_3$) and the combination thereof. The alkali-ion containing bath may include a single bath or multiple baths comprising $KNO_3$, NaNO3, or a mixture thereof.

The temperature of the molten salt bath and treatment time period can vary. It is within the ability of one skilled in the art to determine the time and temperature according to the desired application. By way of a non-limiting example, the temperature of the molten salt bath may range from about 200° C. to about 800° C., such as from about 400° C. to about 500° C. and the predetermined time period may range from about 4 to about 30 hours, although other temperature and time combinations are envisioned. By way of a non-limiting example, the glass-ceramics can be submerged in a $KNO_3$ bath, for example, at about 460° C. for about 16 hours to obtain a K-enriched layer which imparts a surface compressive stress. In some embodiments, lithium (Li) ions, for example, could be replaced by sodium (Na), ions in the machinable glass-ceramic (and/or glass article). In other embodiments, sodium (Na) ions, for example, could be replaced by, potassium (K) ions in the machinable glass-ceramic (and/or glass article).

In some embodiments, provided is a method for forming a machinable glass-ceramic, wherein the method comprises melting a batch and forming a glass comprising the precursor glass materials as described herein; casting, annealing, ceramming, optionally machining, cooling, and ion exchanging the glass article by placing the glass article in a alkali ion-containing salt bath exhibiting a temperature sufficiently below the glass strain point; holding the glass in the salt bath for time sufficient to complete ion exchange of Na-ions to a desired depth level, wherein the glass-ceramic article contains (a) a predominant silicate of one or more crystal phase, one of which is a micaceous phase, and (b) glass; and cooling the machinable glass-ceramic to room temperature. In some embodiments, the micaceous phase can be one or more of fluorophlogopite, fluorrichterite and yangzhumingite.

Ion-exchange is generally conducted in a bath of molten salt. For example, the glass-ceramic materials can be ion-exchanged in sodium and/or potassium-containing baths, using any of the nitrates, sulfate and halide baths, pure or mixed. Mixed alkali baths can also be used. Typical temperatures for ion exchange are between 390° C. and 500° C., however in some embodiments temperatures above 500° C. can also be used. Ion exchange durations can range from short times, such as about 10 min to longer times of about 20 h. In one embodiment, the method involves ion exchanging the glass article by placing the glass article in a Na-containing salt bath, exhibiting a temperature sufficiently below the glass strain point, and holding the glass sheet for time sufficient to complete ion exchange of Li for Na ions throughout some thickness the glass article, for example sufficient for the exchanged ion to achieve a depth of penetration 3% to about 23% of thickness. Greater than 23% depth of penetration, if desired, can also be achieved by modulating the ion-exchange process. When the parts are ion-exchanged such that a spike is achieved on the surface, the depth of that portion of the profile can be between 2 and 30 um with a depth of compression from 10 to 23% of thickness. In other embodiments, the method involves ion exchanging the glass article by placing the glass article in a K-containing salt bath.

Ion-exchange from the surface of an alkali ion in the glass or glass-ceramic by a bigger one from the bath leads to compressive stress at the surface (CS) and because of the concentration distribution to a stress profile through the sample. The mechanical properties are dependent on the stress level at the surface and the depth of penetration of the bigger ion. Since the resulting materials are opaque, measurement of the resulting stress profile can be challenging. Therefore, methods such as electron probe microanalysis (EPMA) or glow discharge optical emission spectroscopy (GDOES) are used to determine the ion exchange concentration profile. The crystalline phases can be determined by X-ray diffraction (XRD).

In some embodiments, the glass-ceramics described herein have good machinability, i.e., the ability to be machined, using conventional tools. For example, the glass-ceramics described herein can be subjected to various machining processes such as cutting, polishing, grinding, turning, drilling milling, sawing, tapping, soldering, or other methods for forming it into a desired shape, including complex design shapes. The machinability of the glass-ceramics can be characterized, in one embodiment, using the Machinability Index (MI) described in the examples. In at least some contemplated embodiments, glass-ceramics disclosed herein may not be particularly machinable.

The machinability of the glass-ceramics reduces the costs for processing and extends the field of application and use. The machinable glass-ceramics described herein may be used for a variety of applications including articles such as enclosure or housing for electronic devices or portable computing devices, light diffusers, appliances, automotive, dielectric components, aerospace components, laboratory equipment, laser technology, surgical devices, and forming various shaped articles such as perforated discs or squares, and the like.

Definitions

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. As a non-limiting example, a reference to "X and/or Y" can refer, in one embodiment, to X only (optionally including elements other than Y); in another embodiment, to Y only (optionally including elements other than X); in yet another embodiment, to both X and Y (optionally including other elements).

When a composition herein is given a range of 0-Z wt. %, this range refers to the amount of material added to a batch and excludes contaminant levels of the same material. As those skilled in the art would appreciate, metals, for example, sodium and iron, are frequently found at contaminant levels in batched glass and glass-ceramic products. Consequently, it is to be understood that in those cases where a material is not specifically added to a batch, added, any such material that may be present in an analyzed sample of the final glass-ceramic material is contaminant material. Except for iron oxides, where contaminant levels are typically around the 0.03 wt. % (300 ppm) level, contaminant levels are less than 0.005 wt. % (50 ppm). The term "consistently essentially of" is to be understood as not including contaminant levels of any material.

As used herein, the term "ion-exchanged" or "ion-exchangeable" is understood to mean treating the glass-ceramic with a heated solution containing ions having a different ionic radius than ions that are present in the glass-ceramic surface and/or bulk, thus replacing those ions with, for example, smaller ions. For example, lithium can go in the glass-ceramic to replace the sodium ions.

As used herein the terms "ceram" and "heat treat" are used interchangeably and the terms "ceramming" and "heat treating" are used interchangeably and include the thermal treatment of precursor glasses to form glass-ceramics.

The phrase "average grain size" refers to a mean value of lengths of the major faces of the grains.

As used herein, "aspect ratio" represents the ratio between the largest dimension of a particle and a smaller dimension of the grain or particle.

As used herein, the phrase "predominant crystalline phase" means that such a crystalline phase constitutes the greatest percent weight of the all the crystalline phases in the machinable glass-ceramics described herein. For example, the glass ceramic compositions disclosed herein may include trisilicic mica and/or tetrasilicic mica, or a mica solid solution between trisilicic and tetrasilicic, as the predominant or most prevalent crystalline phase of the glass-ceramic in terms of quantity, such as for example, at least 15%, at least 30%, at least 50%, or at least 80% by weight of all crystalline phases of the glass-ceramic consisting thereof.

As used herein, the phrase "machinable" means that glass-ceramics can be machined using conventional tools, e.g., similar to machine processing of common metals. Thus, the glass-ceramics can be machined, i.e. subjected to various processes at different levels by which a piece of the glass-ceramic is altered into a desired final shape and size. For example, the glass-ceramic can be cut, drilled, polished or milled. Other exemplary machining processes are described herein and include turning, milling, shaving, sawing, drilling, grinding, threading or the like, so as to produce components and parts with accurate tolerance and desired shape and surface smoothness. The machinable glass-ceramics can undergo such processing without explosion or rupture of work pieces.

EXAMPLES

Various embodiments will be further clarified by the following examples, which are in no way intended to limit this disclosure thereto.

Example 1: Preparation of Machinable Glass-Ceramics

Tables 1 and 2 provide examples of representative compositions according to the present technology. Exemplary glass-ceramics described herein are trisilicate or tetrasilicate, or a mica solid solution between trisilicic and tetrasilicic, crystalline glass-ceramics which exhibit a base composition comprising, in weight percent on the oxide basis, of the constituents listed in Table 1 and Table 2.

Key for phase abbreviations.

| Abbreviation | Name | Composition | Type |
|---|---|---|---|
| FPh | F fluorphlogopite | $K_{1-x}Mg_3Al_{1-x}Si_{3+x}O_{10}F_2$ | trisilicic mica |
| Y | yangzhumingite | $(K, Na)Mg_{2.5}Si_4O_{10}F_2$ | tetrasilicic mica |
| NaFl | Na fluorrichterite | $Na_4Mg_5Si_8O_{22}F_2$ | amphibole |
| NaPh | Na fluorphlogopite | $NaMg_3AlSi_3O_{10}F_2$ | trisilicic mica |
| KPH | K fluorphlogopite | $KMg_3AlSi_3O_{10}F_2$ | trisilicic mica |
| NaTN | Na taeniolite | $NaMg_2LiSi_4O_{10}F_2$, $NaMg_{2.5}Si_4O_{10}F_2$ or solid solution (s.s.) between these phases | tetrasilicic mica |
| β-spod | β-spodumene | $LiAlSi_2O_6$ | |
| Enstatite | Enstatite | $MgSiO_3$ | |
| GH | gahnite | $ZnAl_2O_4$ | |
| R | Rutile | $TiO_2$ | |

TABLE 1

| wt. % oxide* | MACOR ® | IE | IM | IW | KI | KS | LE | LS | NE |
|---|---|---|---|---|---|---|---|---|---|
| $SiO_2$ | 47.2 | 66.5 | 62.0 | 65.5 | 67.4 | 55.6 | 62.3 | 56.8 | 56.5 |
| $Al_2O_3$ | 16.7 | 0 | 0 | 0 | 0 | 13.5 | 11.7 | 13.5 | 13.4 |
| MgO | 14.5 | 18.0 | 17.5 | 18.3 | 18.2 | 19 | 15.7 | 18.9 | 18.8 |
| $Na_2O$ | 0 | 2.5 | 7.5 | 3.5 | 5.2 | 2.1 | 2.9 | 4.2 | 5.2 |
| $K_2O$ | 9.5 | 8 | 6.4 | 8 | 4.1 | 3.1 | 2 | 0 | 0 |
| $Li_2O$ | 0 | 0 | 0 | 0 | 0 | 2 | 2.2 | 2 | 1.5 |

TABLE 1-continued

| wt. % oxide* | MACOR® | IE | IM | IW | KI | KS | LE | LS | NE |
|---|---|---|---|---|---|---|---|---|---|
| $ZrO_2$ | 0 | 2 | 3.7 | 1.5 | 2 | 0 | 0.5 | 0 | 0 |
| F | 6.3 | 5.2 | 5.2 | 5.5 | 5.2 | 8.1 | 5.7 | 8 | 7.9 |
| $B_2O_3$ | 8.5 | 0 | 0 | 0 | 0 | 0 | 0 | 0 | 0 |
| sum | 102.7 | 102.2 | 102.3 | 102.3 | 102.1 | 103.4 | 102.4 | 103.4 | 103.3 |
| O=F** |  | 2.2 | 2.2 | 2.4 | 2.2 | 3.4 | 2.4 | 3.4 | 3.3 |
| Total |  | 100 | 100.1 | 99.9 | 99.9 | 100 | 100 | 100 | 100 |
| Phase | FPh, glass | Y, glass | Y, glass | Y, NaFl, glass | Y, NaFl, glass | Y, glass | Y, glass | NaFPh, Y—NaTN s.s glass | — |

*Minor phases are not reported.
**In the glass F is distributed among various cations i.e., some of the oxygen in the oxides is replaced by fluorine, and therefore the oxygen equivalent of fluorine (16/38 × amount of F) is subtracted from the samples to reach 100%.

TABLE 2

| wt. % oxide* | IX | QA | PR | MB | GO | LS | A | B | C |
|---|---|---|---|---|---|---|---|---|---|
| $SiO_2$ | 60.8 | 56.3 | 61.9 | 60.2 | 55.4 | 56.9 | 67.82 | 54.62 | 65.07 |
| $Al_2O_3$ | 15.5 | 13.3 | 13.2 | 13.7 | 13.2 | 13.5 | 20.80 | 28.30 | 20.1 |
| MgO | 14.2 | 18.7 | 15.7 | 16.6 | 18.4 | 18.9 | 1.84 | 2.78 | 1.9 |
| $Na_2O$ | 3.1 | 4.2 | 5.0 | 4.8 | 4.1 | 4.2 | 2.33 | 1.67 | 0.4 |
| $Li_2O$ | 3.0 | 2.0 | 1.4 | 1.4 | 2.0 | 2.0 | 3.92 | 5.00 | 3.5 |
| $ZrO_2$ | 0.0 | 2.0 | — | — | — | — | — | — | — |
| F | 5.9 | 6.1 | 4.9 | 5.7 | 7.8 | 8.0 | — | — | — |
| $B_2O_3$ | — | — | — | — | 2.4 | — | 2.07 | 6.58 | 2.18 |
| $K_2O$ | — | — | — | — | — | — | 0.00 | 0.29 | 0 |
| CaO | — | — | — | — | — | — | 0.00 | 0.50 | 0 |
| $SnO_2$ | — | — | — | — | — | — | 0.15 | 0.20 | 0.23 |
| ZnO | — | — | — | — | — | — | 1.08 | 0.00 | 2.28 |
| $TiO_2$ | — | — | — | — | — | — | 0.00 | 0.00 | 4.4 |
| sum | 102.5 | 102.6 | 102.1 | 102.4 | 103.3 | 103.5 |  |  |  |
| O=F** | 2.5 | 2.6 | 2.1 | 2.4 | 3.3 | 3.4 | — | — | — |
| Total | 100.0 | 100.0 | 100.0 | 100.0 | 100.0 | 100.1 |  |  |  |
| Phase | Mica, β-spod, glass | Mica, β-spod, glass | 2 micas (NaPh, Y—NaTN s.s.), Enstatite, β-spod, glass | 2 micas (NaPh, Y—NaTN s.s.), β-spod, glass | 2-micas (NaPh, Y—NaTN s.s.), glass | 2-micas (NaPh, Y—NaTN s.s.), glass | Glass | Glass | β-spod, GH, R |

*Minor phases are not reported.
**In the glass F is distributed among various cations i.e., some of the oxygen in the oxides is replaced by fluorine, and therefore the oxygen equivalent of fluorine (16/38 × amount of F) is subtracted from the samples to reach 100%.

The precursor glasses were made in a platinum crucible using a batch of raw materials listed in Table 1 and Table 2. Each crucible containing a formulated raw materials batch was placed in a preheated furnace and were melted at 1425° C. for 5 h. The glasses were refined to produce molten precursor glass that was then cast into 5×6 inch blocks precursor glass that were annealed for annealed at −550° C. The precursor glasses were cerammed according to the schedule given in the Table 3, using a 5° C./min ramp rate. After holding at the growth temperature the resulting materials were left to cool at furnace rate. Commercial MACOR® from (Corning Incorporated, Corning, N.Y.) was used for comparison.

TABLE 3

| Ceramming schedule ||||
|---|---|---|---|
| Step | Temperature | Ramp rate (° C./min) | Hold time (h) |
| Nucleation | 800° C. | 5 | 4 |
| Growth | 1075° C. | 5 | 4 |

Example 2: Ion-Exchange of Machinable Glass-Ceramics

Some of the machinable glass-ceramics prepared according to the process of example 1, were ion exchanged at the designated salt bath, at the times and temperatures listed in Table 4.

TABLE 4

| Ion-exchange parameters ||||
|---|---|---|---|
| Sample | Ion-exchange bath salt | Bath temperature (° C.) | Time (h) |
| MACOR® | Cannot be ion-exchanged |||
| IE | $KNO_3$ | 460 | 16 |
| IW | $KNO_3$ | 460 | 16 |
| LS | $NaNO_3$ | 430 | 20 |
| PR | $NaNO_3$ | 430 | 1.5 |
| PR | $NaNO_3 + KNO_3$ | 430 | 1.5 + 0.25 |

Example 3: Characterization

In the following examples, various characterizations of the materials listed in Table 1 will be described. The characterizations may include CIELAB color space coordinates, translucency, opacity, viscosity, annealing point, strain point, dielectric parameters, identity of the crystalline phases and/or crystal sizes, elemental profiles, compressive stress profiles, Vickers hardness, Moh's hardness, coefficient of thermal expansion (CTE), fracture toughness (G; K1c^2/E), Brittleness Index (B; H/k1c). Exemplary methods used for characterization are provided below.

Annealing point and strain point of precursor glasses described herein can be measured by methods known to those in the art, such as, those described in ASTM C598 (and its progeny, all herein incorporated by reference) "Standard Test Method for Annealing Point and Strain Point of Glass by Beam Bending," ASTM International, Conshohocken, Pa., US.

Identity of the crystalline phases of crystal phase assemblages and/or crystal sizes of a crystalline phase were determined by X-ray diffraction (XRD) analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Elemental profiles measured for characterizing surfaces of precursor glasses, and glass-ceramics were determined by analytical techniques know to those in the art, such as, electron microprobe (EMP); x-ray photoluminescence spectroscopy (XPS); secondary ion mass spectroscopy (SIMS). etc.

Ion exchange concentration profile can be determined by techniques such as electron probe micro-analyzer (EPMA) or glow discharge optical emission spectroscopy (GDOES).

Vickers hardness of the materials can be characterized by methods known to those in the art, such as, those described in ASTM C1327 (and its progeny, all herein incorporated by reference) Standard Test Methods for Vickers Indentation Hardness of Advanced Ceramics," ASTM International, Conshohocken, Pa., US.

Knoop hardness of the materials can be characterized by methods known to those in the art, such as, those described in ASTM C1326-13(2018) (and its progeny, all herein incorporated by reference) Standard Test Methods for Knoop Indentation Hardness of Advanced Ceramics," ASTM International, Conshohocken, Pa., US.

Moh's hardness is a comparison test involving the assignment of a relative number to known materials based on their ability to scratch one another. Some examples of the Mohs' hardness scale which ranks materials from 1-10, are graphite with a Mohs' hardness of 1, manganese with a Mohs' hardness of 5, orthoclase with a Mohs' hardness of 6, quartz with a Mohs' hardness of 7 and diamond with a Mohs' hardness of 10. Each GC sample was scratched with the tips of materials having different hardness and the reading was noted for a material that left a scratch on the GC and the next material below (softer) which does not leave a scratch on the GC. For example, for a GC sample with a reported hardness of 6.5, a quartz tip would scratch the GC while orthoclase would not.

G-ratio, by definition, is the Volume of Material Ground (removed) divided by the Volume of Abrasive Tool Lost (e.g., volume of material removed per unit volume of wheel whear). Grinding wheel suppliers use this to gauge abrasive tooling cost per component produced. A lower G-ratio means more abrasive tooling is consumed increasing abrasive tooling cost per component produced. G-ratio was measured using a resin-bonded diamond tool test known in the art. Such resin-bonded diamond tool are described, for example, in in EP 1706221B1 U.S. Patent No.

The fracture toughness may be measured using known methods in the art, for example, using a chevron notch, short bar, notched beam and the like, according to ASTM C1421-10, "Standard Test Methods for Determination of Fracture Toughness of Advanced Ceramics at Ambient Temperature." Failure stresses were determined by introducing specific flaw sizes into the parts followed by 4-point bend testing using a commonly known method according to EN ISO 1288-3, for example a method described in the article titled Determination of Bending Tensile Strength of Thin Glass" by J. Neugenbauer, which is incorporated by reference herein.

CIELAB color space coordinates (e.g., CIE L*; CIE a*; and CIE b*; or CIE L*, a*, and b*; or L*, a*, and b*) for describing the color of colored and opaque glass-ceramic(s) and/or ion exchanged colored and opaque glass-ceramic(s) according to aspects of embodiments and/or embodiments of this disclosure were determined by methods known to those in the art from total reflectance—specular included—measurements, such as, those described in U.S. Pat. No. 9,790,125, the contents of which are relied upon and incorporated herein by reference in their entirety.

Table 5 provides comparative properties of exemplary composition of the glass-ceramics described herein and those of nominal glass and MACOR® which is a commercially machinable glass-ceramic.

TABLE 5

| Property | Units | Glass-ceramics | | | | | | |
|---|---|---|---|---|---|---|---|---|
| | | Macor | IE | IW | IX | LS | PR | MB |
| density, glass | g/cc | | 2.52 | 2.524 | | | | |
| density | g/cc | 2.52 | 2.578 | 2.552 | 2.551 | | 2.578 | |
| strain point | ° C. | | | | | | | |
| anneal point | ° C. | | | | | | | |
| Young's Modulus | GPa | 66.9 | 66.7 | 65.0 | 64.7 | 66.9 | 70.3 | 66.4 |
| Shear Modulus | GPa | 25.5 | 27.3 | 26.8 | 26.1 | 27.0 | 28.3 | 26.6 |
| Poisson's Ratio | — | 0.29 | 0.224 | 0.21 | 0.236 | 0.241 | 0.239 | 0.247 |

TABLE 5-continued

| Property | Units | | | | | | | |
|---|---|---|---|---|---|---|---|---|
| Fracture toughness | MPa√m | 1.50 | 1.49 | 1.91 | 2.35 | 1.33 | 1.41 | 1.54 |
| | +/- | 0.109 | 0.08 | 0.03 | 0.042 | 0.039 | 0.041 | 0.209 |
| Vickers hardness, 200 g | kgf | 400 | 301 | 299 | 355 | | | |
| | GPa | 3.92 | 2.95 | 2.93 | 3.48 | | | |
| Knoop Hardness, 100 g | kg/mm^2 | 250 | 279 | 319 | 313 | | | |
| Moh's hardness, GC | | 3.5 | 3.5 | 4.5 | | | 5.5 | 4.5 |
| Moh's hardness, PG | | | | | | | 6.5 | |
| B (H/k1c) | 1/um^0.5 | 2.62 | 1.98 | 1.54 | 1.48 | 0.00 | 0.00 | 0.00 |
| G (k1c^2)/E | P*m | 33.54 | 33.40 | 55.87 | 85.10 | 26.25 | 28.46 | 35.90 |
| L*a*b*, D65, SCI, white bkgd (1 mm) | — | 96.25, 0.32, 1.5 | 95.2, −0.72, 1.98 | | | | | |
| opacity (1 mm) | — | 83.5 | 84.3 | | | | | |
| CTE (10^−7) (1/C) 0-600 C. | | 90 | 69 | 58 | 43 | | 80 | |
| Failure stress, sqrt((G*E)/(pi*m)), m = 1 mm | MPa | 26.73 | 26.64 | 33.99 | 41.86 | 23.64 | 25.23 | 27.55 |

| | | Glass-ceramics | | | | | nominal |
|---|---|---|---|---|---|---|---|
| Property | Units | GO | OM | OU | RL | RT | glass |
| density, glass | g/cc | | | | | | |
| density | g/cc | | | | | | |
| strain point | ° C. | | | | | | |
| anneal point | ° C. | | | | | | |
| Young's Modulus | GPa | 65.2 | 55.3 | 70.9 | 60.1 | 56.4 | 70 |
| Shear Modulus | GPa | 26.1 | 22.7 | 29.2 | 24.9 | 22.2 | |
| Poisson's Ratio | — | 0.251 | 0.219 | 0.211 | 0.207 | 0.269 | |
| Fracture toughness | MPa√m | 1.25 | 1.77 | 1.99 | 1.69 | | 0.70 |
| | +/- | 0.05 | 0.122 | 0.025 | 0.06 | | |
| Vickers hardness, 200 g | kgf | | | | | | |
| | GPa | | | | | | |
| Knoop Hardness, 100 g | kg/mm^2 | | | | | | |
| Moh's hardness, GC | | 3.5 | | 5.5 | 4.5 | | |
| Moh's hardness, PG | | | | | | | |
| B (H/k1c) | 1/um^0.5 | 0.00 | 0.00 | 0.00 | 0.00 | | |
| G (k1c^2)/E | P*m | 23.84 | 56.78 | 55.87 | 47.73 | | 7.00 |
| L*a*b*, D65, SCI, white bkgd (1 mm) | — | | | | | | |
| opacity (1 mm) | — | | | | | | |
| CTE (10^−7) (1/C) 0-600 C. | | | | | | | |

TABLE 5-continued

| | | | | | | |
|---|---|---|---|---|---|---|
| Failure stress, sqrt((G*E)/(pi*m)), m = 1 mm | MPa | 22.25 | 31.61 | 35.50 | | 12.49 |

Figure 2:
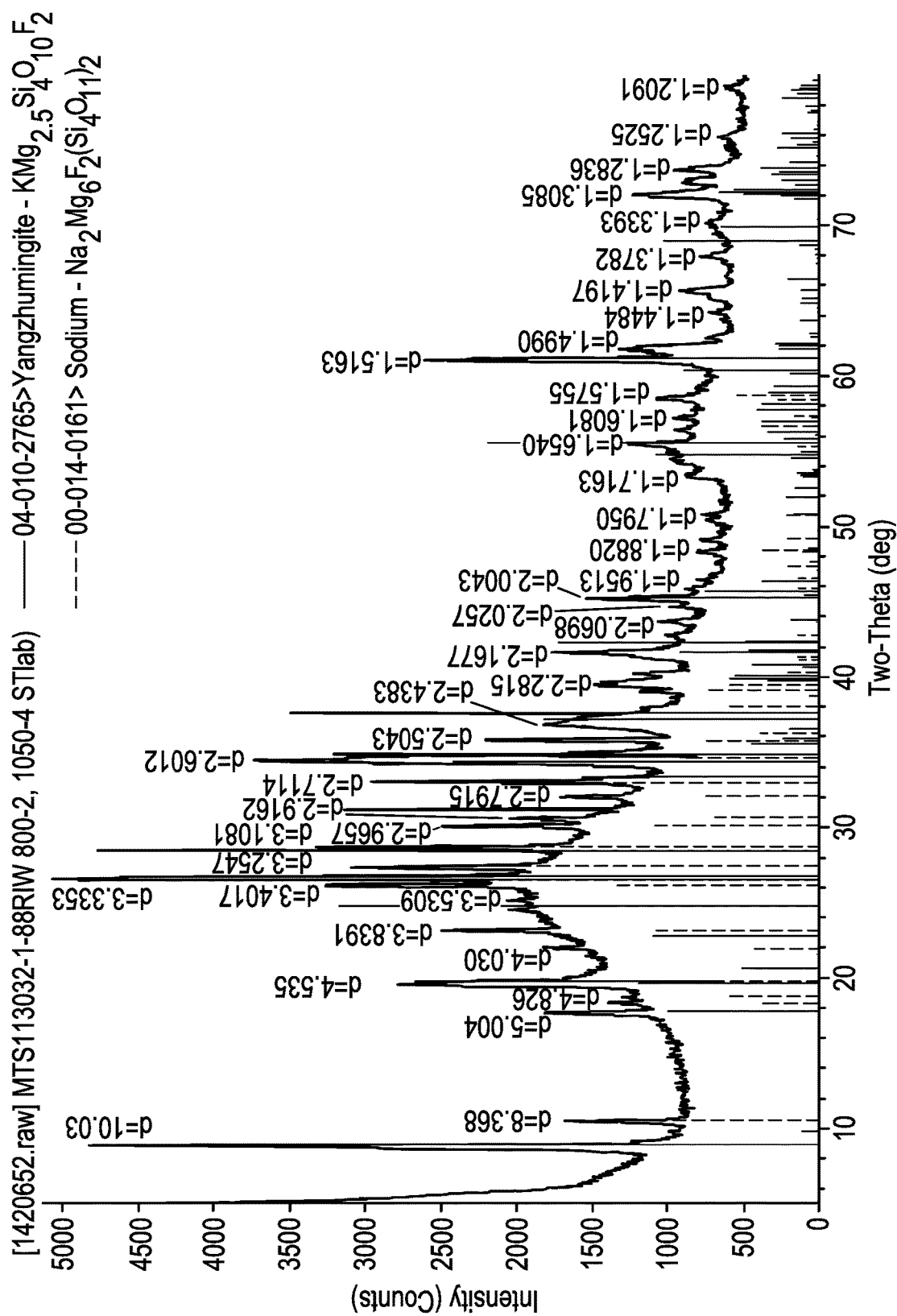
FIG. 2 is an XRD of mixed Yangzhumingite mica and Na-Fluorrichterite ($Na_4Mg_5Si_8O_{22}F_2$) amphibole glass-ceramic.

An XRD analysis was performed on the precursor glasses or resulting glass-ceramics. XRD pattern for tetrasilicic mica ($KMg_{2.5}Si_4O_{10}F_2$-Yangzhumingite) glass-ceramic is shown in FIG. 1. XRD pattern for mixed Yangzhumingite mica and Na-Fluorrichterite ($Na_4Mg_5Si_8O_{22}F_2$) amphibole glass-ceramic is shown in FIG. 2.

Figure 3:
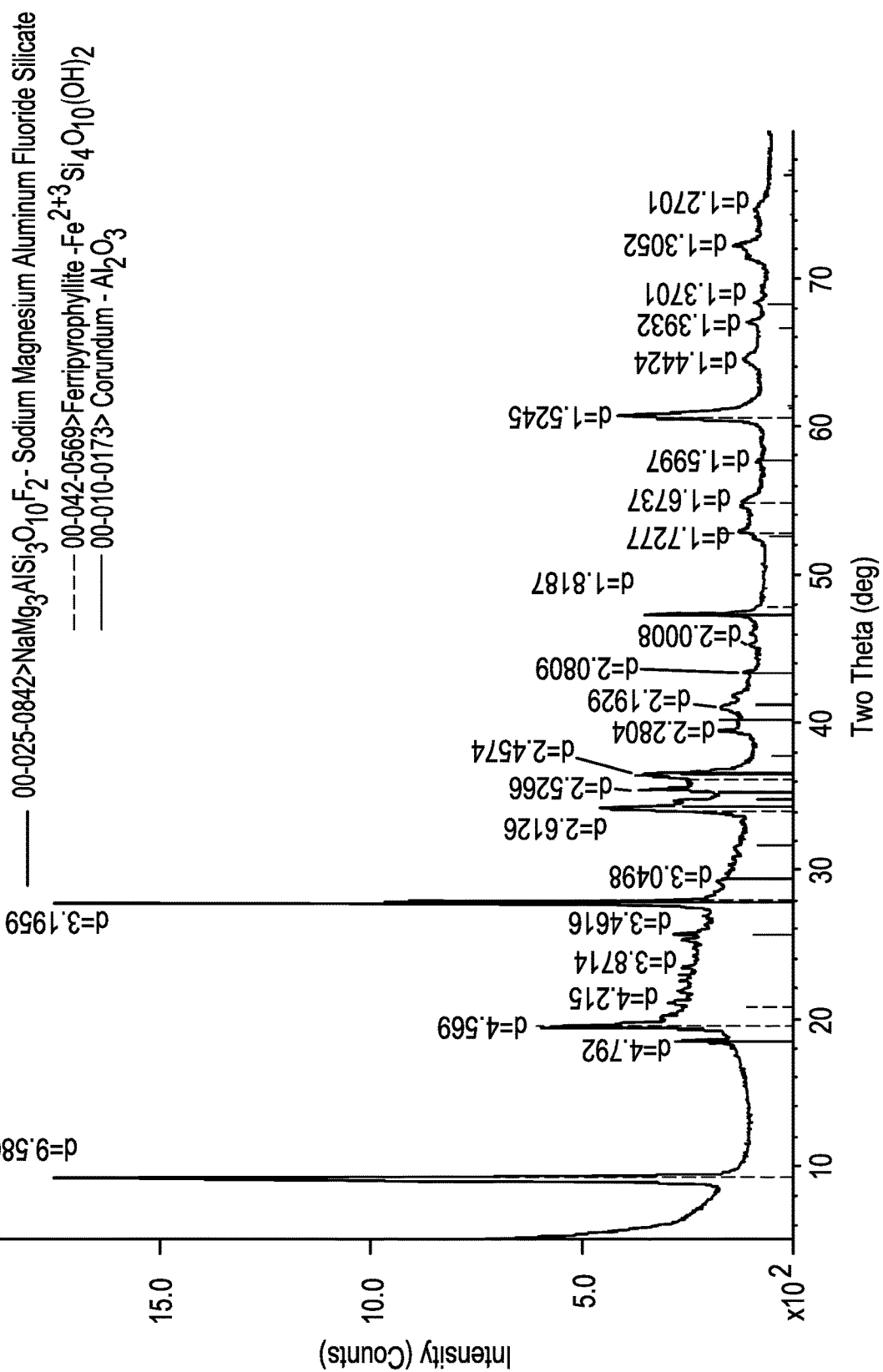
FIG. 3 is an XRD of the machinable glass-ceramic (LS) showing a phase assemblage composed of Na-fluorophlogopite ($NaMg_3AlSi_3O_{10}F_2$) and $NaMg_2LiSi_4O_{10}F_2$ or $NaMg_{2.5}Si_4O_{10}F_2$, or solid solution between these.

FIG. 3 shows the XRD pattern for LS which indicates a phase assemblage composed of Na-fluorophlogopite ($NaMg_3AlSi_3O_{10}F_2$) in partial solid solution with delaminating $NaMg_2LiSi_4O_{10}F_2$ or $NaMg_{2.5}Si_4O_{10}F_2$, or solid solution between these.

Figure 4:
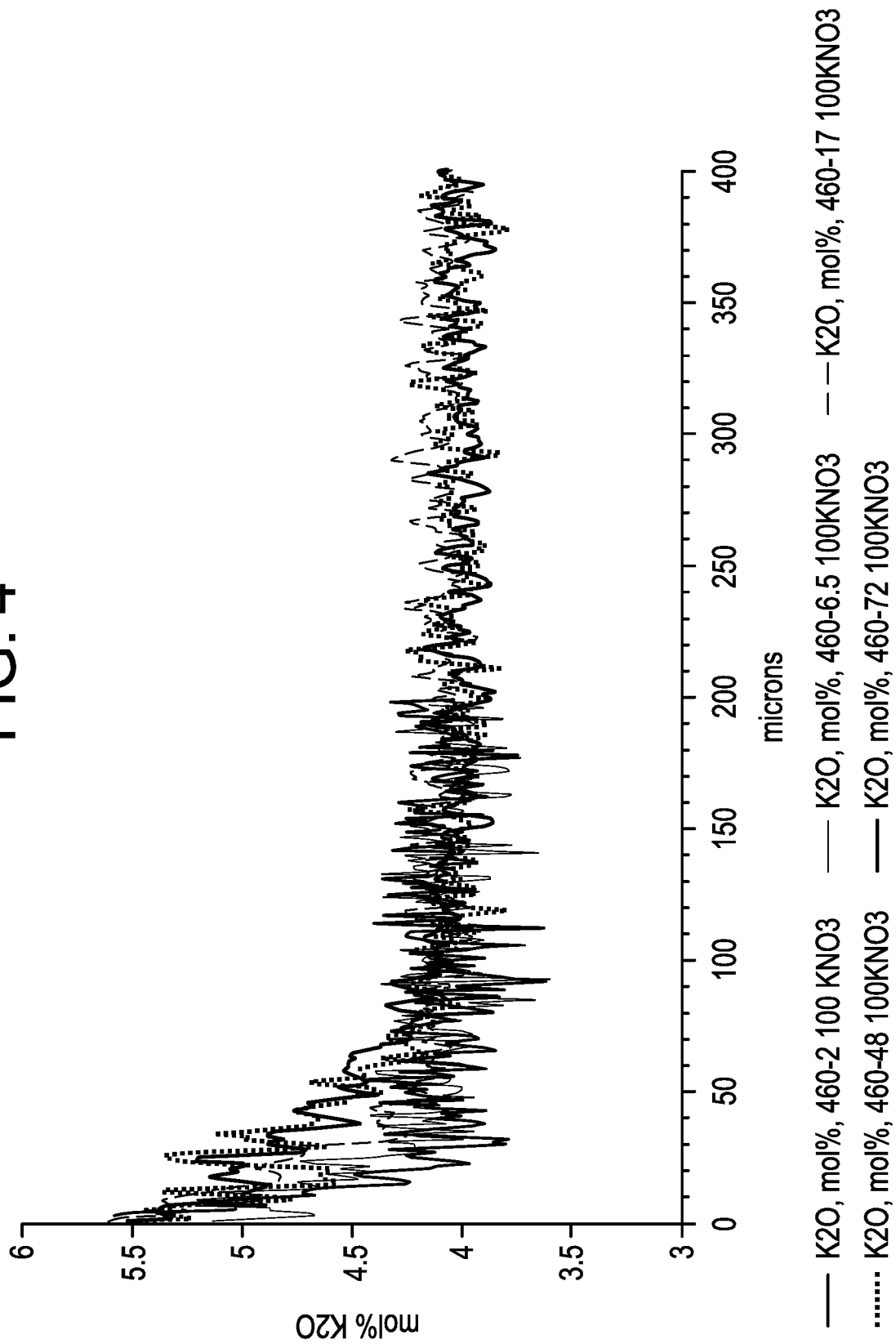
FIG. 4 is a graph showing the evolution of the $K_2O$ profile as a function of depth after ion exchange in $KNO_3$ at 460° C. for Composition IE.

FIG. 4 is a graph showing the evolution of the $K_2O$ profile as a function of depth after ion exchange in $KNO_3$ at 460° C. for Composition IE. Potassium ion penetration is roughly 60 microns for this material under this condition. Concentration profiles (corresponding to stress profiles) than can be made include the complementary error function (erfc), parabolic and parabolic with the addition of a 'spike' on the surface. Depths of ion compression or penetration for the erfc and parabolic profiles can be from 3% to 23% of thickness. When the parts are ion-exchanged such that a spike is achieved on the surface, the depth of that portion of the profile can be between 2 and 30 um with a depth of compression from 10 to 23% of thickness.

Figure 5:
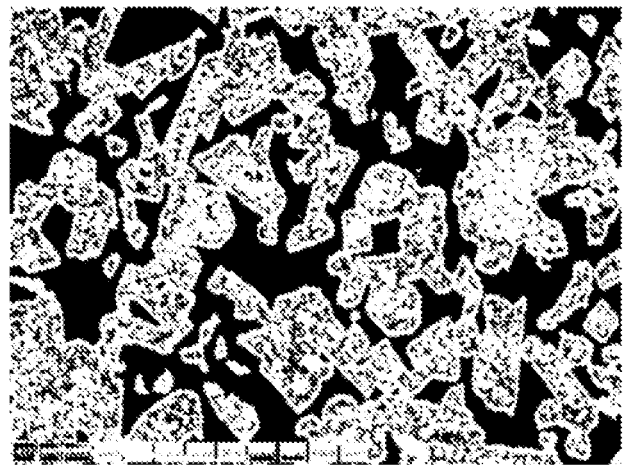
FIG. 5 shows an SEM micrographs of glass-ceramics LS for distribution of magnesium showing the crystalline and glass distributions.

FIG. 5 shows an SEM micrograph of the machinable, glass-ceramics LS showing distribution of magnesium. Grey to white colors represent higher Mg, whereas areas that are black have low/no measurable Mg. The Mg partitions into the mica phase, thus this micrograph suggests that the machinable glass-ceramic is highly crystalline.

Figure 6:
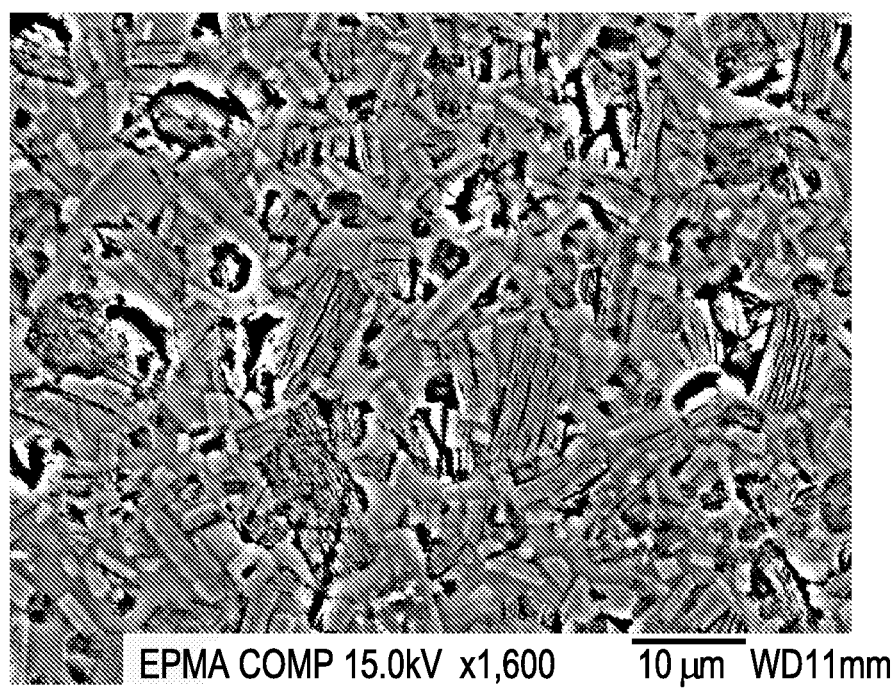
FIG. 6 shows the SEM micrograph of the machinable, glass-ceramic (Composition LS) showing thin mica ($NaMg_3AlSi_3O_{10}F_2$) and $NaMg_2LiSi_4O_{10}F_2$ or $NaMg_{2.5}Si_4O_{10}F_2$, or solid solution between these.

FIG. 6 shows the SEM micrograph of the machinable, glass-ceramics LS showing thin mica ($NaMg_3AlSi_3O_{10}F_2$) and $NaMg_2LiSi_4O_{10}F_2$ or $NaMg_{2.5}Si_4O_{10}F_2$, or solid solution between these.

Figure 7:
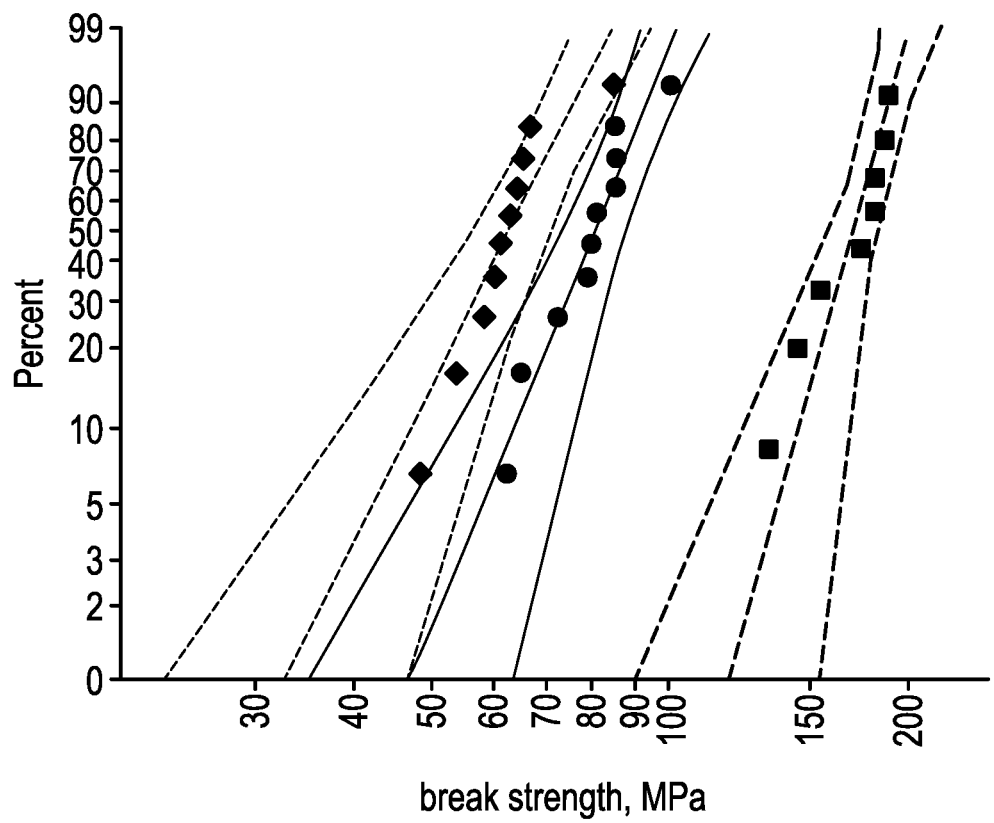
FIG. 7 is a plot showing comparison of strengths of MACOR®, IE and ion-exchanged IE using a ring-on-ring (RoR) test.

FIG. 7 is a plot showing the comparative strength of MACOR®, IE and ion-exchanged 88-RIE. To determine the strength of the samples, the materials were subjected to a ring-on-ring test as described in U.S. Patent Publication No. 20180155235, the contents of which are relied upon and incorporated herein by reference in their entirety. As seen from FIG. 7, strength of 66.59 MPa, 83.92 MPa, and 175.5 MPa was achieved for the ring-on-ring test for MACOR®, IE and ion-exchanged 88-RIE, respectively. Thus, a strength of over 100 MPa can be achieved for the ion-exchanged glass ceramics disclosed herein. In some embodiments, the machinable glass-ceramics after ion-exchange has a retained strength after abrasion of at least about 100 MPa as measured by abraded ring-on-ring testing.

Figure 8A:
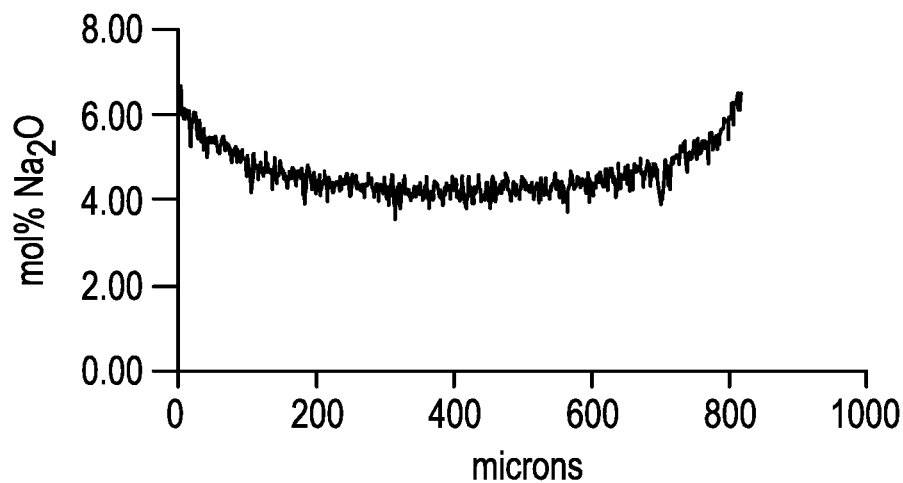
FIG. 8A is a graph showing the evolution of the $Na_2O$ profile as a function of depth after ion exchange in $NaNO_3$ at 430° C. for Composition PR.
Figure 8B:
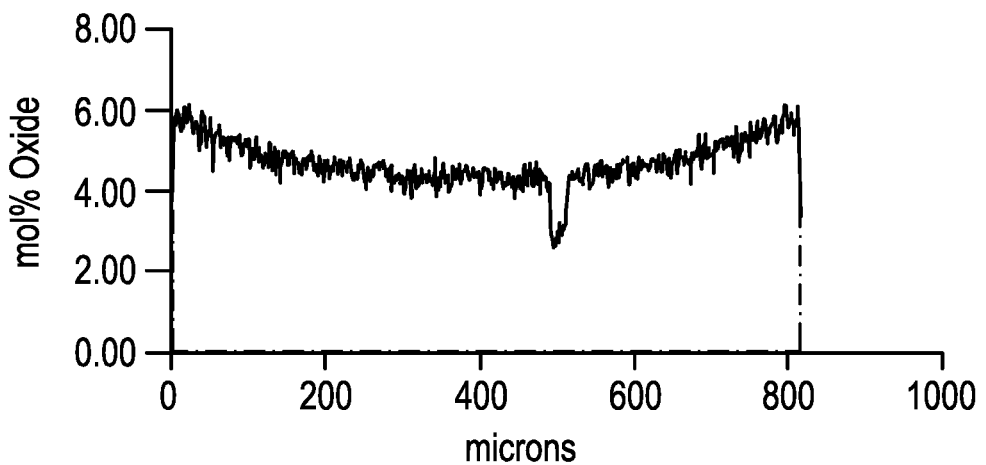

FIG. 8A is a graph showing the evolution of the $Na_2O$ profile as a function of depth after ion exchange in $NaNO_3$ at 430° C. for Composition PR. Depths of ion compression or penetration for the erfc can be from 3% to 23% of thickness. FIGS. 8B and 8C are graphs showing the evolution of the $Na_2O$ and $K_2O$ profile as a function of depth after two-step ion exchange in $NaNO_3$ and $KNO_3$ at 430° C. for Composition PR. Potassium ion penetration is roughly 4 microns for this material under this condition. Concentration profiles (corresponding to stress profiles) than can be made include the complementary error function (erfc), parabolic and parabolic with the addition of a 'spike' on the surface. Depths of ion compression or penetration can be at least 0.5% of the thickness. The graphs shows that a K spike was successfully achieved on the surface of the composition PR.

Figure 9:
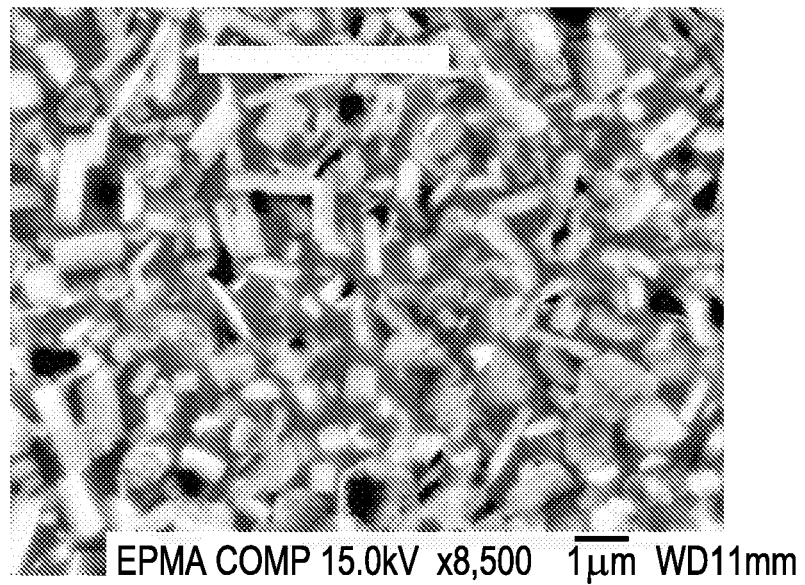
FIG. 9 shows the SEM micrograph of the machinable, glass-ceramic composition PR.

FIG. 9 shows the SEM micrograph of the machinable glass-ceramic composition PR showing interlocking mica grains and glass. The mica grains are in the order of 2-3 um in length (grain size) and have an aspect ratio in the range of 2:1 to 10:1.

Example 4: Machinability Index Analysis

Figure 10A:
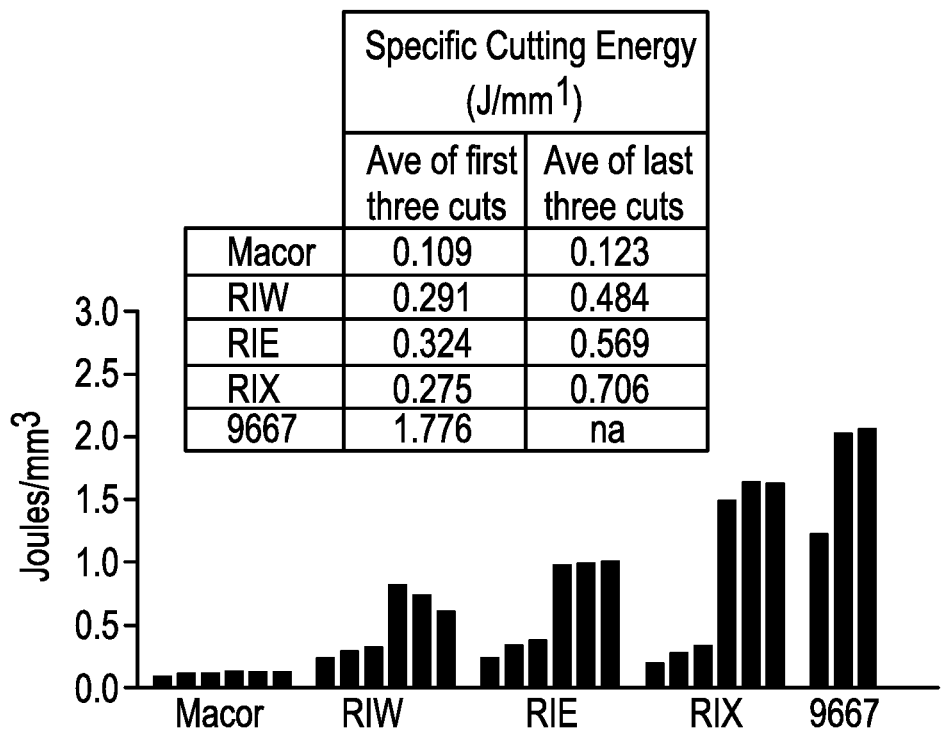
FIGS. 10A and 10B show plots for the change in specific energy (in Joules/mm$^3$) for exemplary glass-ceramics of the invention.
Figure 10B:
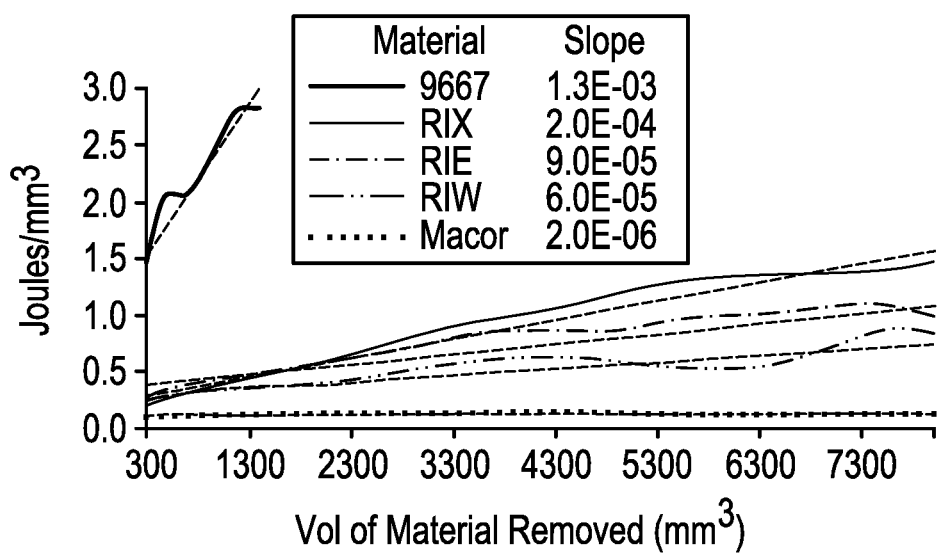

The specific cutting energy quantifies the energy (in Joules) expended per unit volume of material removed. (See e.g., S. Malkin, M. Huerta, "Glass grinding mechanisms and influence on the finished surface and strength", *The Science of Ceramic Machining and Surface Finishing II*, pgs. 93-106, 1979, and M. Piska, "Machining today: from theory to applications", *Thesis: Bruno University of Technology*, 2008.) This parameter can be calculated from force measurement and the process dynamics. While measuring the actual energy exchange is difficult it can be approximated from the cutting power. The cutting power is defined as the vector sum of the three orthogonal forces measured by the dynamometer (the square root of the sum of the squares of the individual forces in the x, y, z-axes) multiplied by the rotational tool velocity. Using this approach, the change in specific energy (in Joules/$mm^3$) for flute tip contact in the low frequency region (14.5 Hz) was calculated as a function of material composition and volume of material removed (FIG. 10A). Data for non-machinable composition (C) is provided for comparison. The Composition C test ended prematurely due to excessive tool wear and sample fracturing. Assuming a change in the plot of specific cutting energy as a function of cumulative material removed was driven solely by progressive wear on the cutting tool, the slope from this relationship can be used to establish a Machinability Index (smaller value=less tool wear), thereby simultaneously comparing compositions and their relative effect on tool wear (FIG. 10B and Table 6).

TABLE 6

| Sample | Machinability Index |
|---|---|
| MACOR® | 2.0E−06 |
| IW | 6.0E−05 |
| IE | 9.0E−05 |
| IX | 2.0E−04 |
| Composition C | 1.3E−03 |

Example 5: G-Ratio

The grinding ratio (G-ratio), which is the ratio of the volume of material removed from the abrasive tool or workpiece to the volume of material worn away from the grinding wheel as a result of the grinding operation, is a parameter used extensively to characterize the effectiveness of a grinding wheel for a specific work-material under a given setup. A high G-ratio means the grinding wheel will have less wear to remove a specific volume of work-material and better control of the cut tolerances. A G-ratio of 1 would indicate that the volume of material removed from the grinding wheel as a result of wheel wear was the same as the volume of material removed from the abrasive tool. Such a low ratio would mean that the grinding wheel would have to be retired after only a few workpieces have been ground, and would require frequent grinding wheel reshaping which is expensive and time consuming. Higher G-ratio indicates a high degree of economy to be realized in production grinding.

A resin-bonded (phenolic polymer) diamond tool test was used to measure the G-ratio for various samples. Table 7 provides comparative G-ratios of an exemplary composition (MA) of the glass-ceramics described herein, standard materials such as sapphire, zirconia, Macor®, and those of comparative compositions A, B and C, which are primarily glass compositions. It was observed that GC Composition PR created a very small amount of abrasive tool wear, and had a G-ratio that was comparable to Macor® and magnitudes higher than the other tested materials.

TABLE 7

| Material | G-ratio |
|---|---|
| Macor | 28212 |
| PR | 21593 |
| Composition A | 376 |
| Composition B | 447 |
| Composition C | 160 |
| Sapphire | 27 |
| Zirconia (CoorsTek YTZP - Y2O3 Partially Stabilized ZrO2) | 2 |

Example 6: Four-Point Bend Testing

Failure stresses were determined by introducing specific flaw sizes into the parts followed by 4-point bend testing. The GC sample used in the four point bending test was 0.8 mm thick. Damage introduction was accomplished by mounting a glass specimen in a non-compliant holder attached to a swing arm by way of edge clamps. An adhesive backed sandpaper disk (30 grit or 80 grit) is attached to the impact surface and the swing arm is raised 95 degrees, imparting an impact force of roughly 470N. The swing arm is then released, with the glass impacting the sandpaper. At least 16 hours after damage introduction, 4 point bend testing is performed.

Specimens are placed damage side down (side in tension) across a 32 mm support span and a force is applied across an 18 mm load span at a constant displacement rate of 5 mm/min until failure. Applied fracture stress $\sigma_{app}$ is then calculated using the equation below, where P is the load to failure in Newtons, L is the support span (36 mm), a is the load span (18 mm), b is the sample width (mm), h is the sample thickness (mm), and v is Poisson ratio.

$$\sigma_{app} = \frac{1}{(1-v^2)} \frac{3P(L-a)}{2bh^2}$$

Fractography is used to determine the flaw depths.

Figure 11:
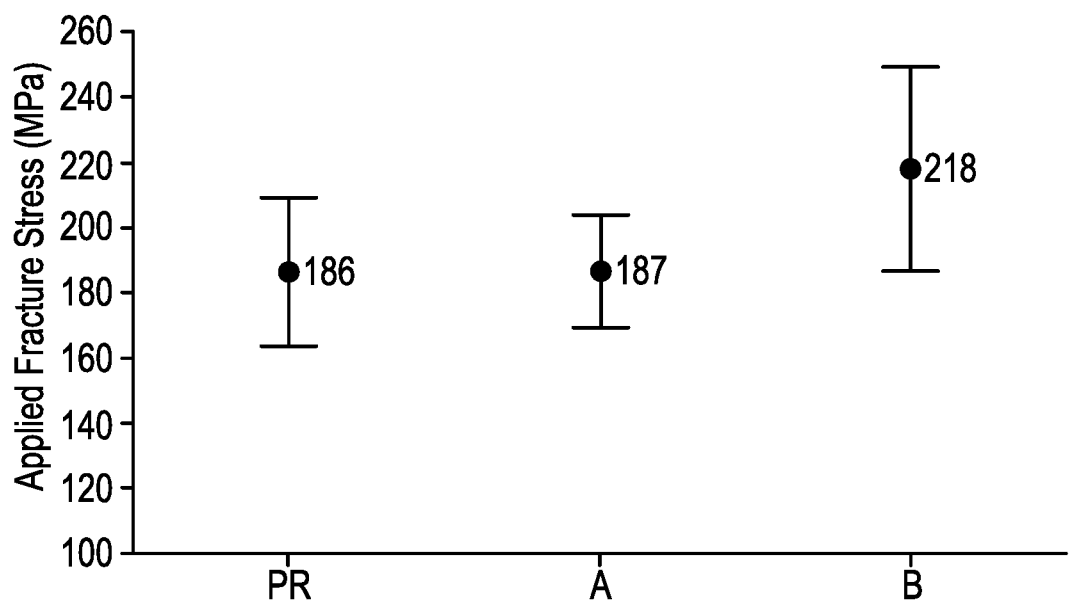
FIG. 11 shows four-point bend failure stress results for glass-ceramic composition PR in comparison with glass compositions after damage introduction using 80 grit size surface.
Figure 12:
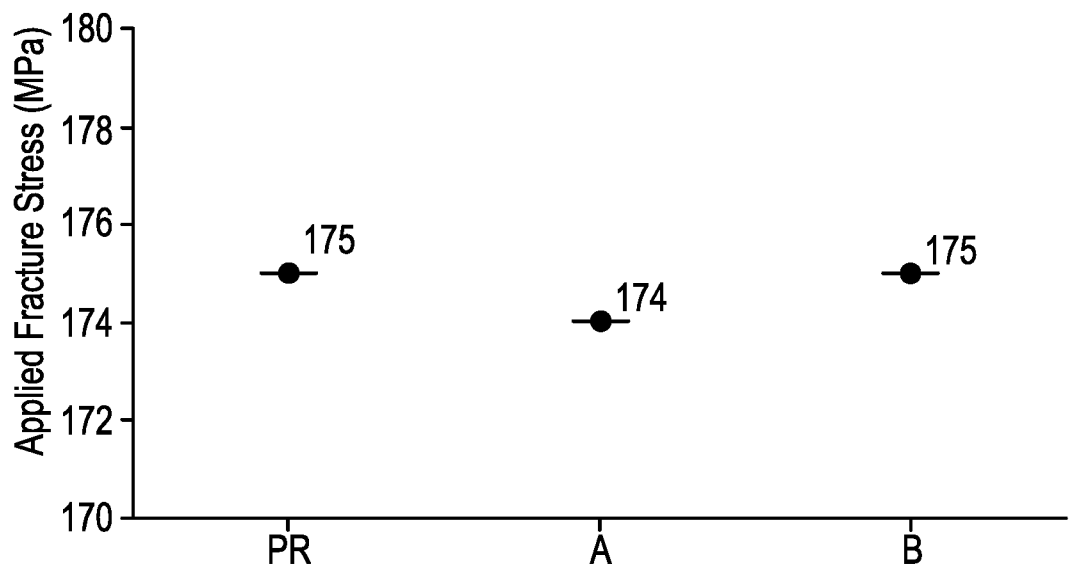
FIG. 12 shows four-point bend failure stress results for glass-ceramic composition PR in comparison with glass compositions after damage introduction using 30 grit size.

The data for the tested glass-ceramic composition PR and glass compositions A and B is shown in FIGS. 11 and 12. FIG. 11 shows the 4PB fracture toughness data for 0.8 mm thick samples of GC composition PR in comparison with glass compositions A and B when tested after damage introduction using 80 grit size surface. FIG. 12 shows similar test data using 30 grit size surface. The figures show that the fracture toughness of GC composition PR is comparable to that of glass compositions A and B at 30 grit testing and comparable to that of glass composition A at 80 grit testing.

What is claimed is:

1. A glass-ceramic comprising:
  a silicate glass phase; and
  a crystalline phase predominantly consisting of a tetrasilicic mica,
wherein the glass-ceramic comprises, by weight percent on an oxide basis, 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F, wherein the total of $Na_2O+Li_2O$ is at least 2 wt. %; and wherein the glass-ceramic is free of $P_2O_5$.

2. The glass-ceramic of claim 1, wherein the glass-ceramic can be ion-exchanged.

3. The glass-ceramic of claim 1, further comprising, by weight percent on an oxide basis, 60 to 70% $SiO_2$, 0 to 2% $Al_2O_3$, 15 to 20% MgO, 2 to 10% $Na_2O$, 0 to 3% $Li_2O$, and 3 to 7% F, wherein the glass-ceramic can be ion-exchanged.

4. The glass-ceramic of claim 1, having an average grain size of 20 microns or less.

5. The glass-ceramic of claim 1, having an average grain size of 2 microns or less.

6. The glass-ceramic of claim 1, comprising from about 30 wt. % to about 80 wt. % crystalline phase.

7. The glass-ceramic of claim 1, having a density of about 2 g/cc to about 3 g/cc.

8. The glass-ceramic of claim 1, having a Young's modulus of about 60 GPa to about 70 Gpa.

9. The glass-ceramic of claim 1, having a Shear modulus of about 18 GPa to about 30 Gpa.

10. The glass-ceramic of claim 1, having a fracture toughness of about 1 MPa·m$^{0.5}$ to about 5.0 MPa·m$^{0.5}$.

11. The glass-ceramic of claim 1, having a Vickers hardness of about 100 kgf to about 400 kgf.

12. The glass-ceramic of claim 1, having a Knoop hardness of about 150 kg/mm$^2$ to about 300 kg/mm$^2$.

13. The glass-ceramic of claim 1, having a Moh's hardness of about 3 to about 7.

14. The glass-ceramic of claim 1, having an opacity of ≥80% for a 1 mm thickness over the wavelength range from about 380 nm to about 740 nm.

15. The glass-ceramic of claim 1, having a Poisson's ratio of about 0.2 to about 0.3.

16. The glass-ceramic of claim 1, having a mechanical strength greater than 100 MPa.

17. The glass-ceramic of claim 1, having a porosity of 0% to 10%.

18. The glass-ceramic of claim 1, wherein the glass-ceramic is machinable.

19. The glass-ceramic of claim 1, which is ion-exchanged.

20. The ion-exchanged glass-ceramic of claim 19, having a depth of ion penetration of about 3% to about 23% of thickness.

21. An article comprising the glass-ceramic of claim 1.

* * * * *